United States Patent [19]

Clark

[11] Patent Number: 5,517,569
[45] Date of Patent: May 14, 1996

[54] METHODS AND APPARATUS FOR INTERFACING AN ENCRYPTION MODULE WITH A PERSONAL COMPUTER

[76] Inventor: Dereck B. Clark, 3642 W. Camino Real, Glendale, Ariz. 85310

[21] Appl. No.: 210,200

[22] Filed: Mar. 18, 1994

[51] Int. Cl.⁶ .............. H04K 1/00; H04L 9/00; H04L 17/02
[52] U.S. Cl. .............. 380/52; 380/23; 380/24; 380/25
[58] Field of Search .............. 380/24, 23, 25, 380/52

[56] References Cited

U.S. PATENT DOCUMENTS

| | | | |
|---|---|---|---|
| 4,123,747 | 10/1978 | Lancto et al. | 235/380 |
| 4,305,059 | 12/1981 | Benton | 340/825.33 |
| 4,341,951 | 7/1982 | Benton | 235/379 |
| 4,536,647 | 8/1985 | Atalla et al. | 235/379 |
| 4,625,276 | 11/1986 | Benton et al. | 364/408 |
| 4,707,592 | 11/1987 | Ware | 235/379 |
| 5,220,501 | 6/1993 | Lawlor et al. | 364/408 |
| 5,406,624 | 4/1995 | Tulpan | 380/25 |

*Primary Examiner*—Stephen C. Buczinski
*Attorney, Agent, or Firm*—Snell & Wilmer; Michael K. Kelly

[57] ABSTRACT

An encryption module for encrypting financial and other sensitive data may be conveniently interposed in series between a personal computer and the keyboard associated therewith. An application program designed to run on the PC is configured to prompt the user to enter his PIN or other confidential data into the encryption module; consequently the confidential data need not be transmitted in an unencrypted fashion, and need not reside on the PC hard drive in an unencrypted form.

21 Claims, 28 Drawing Sheets

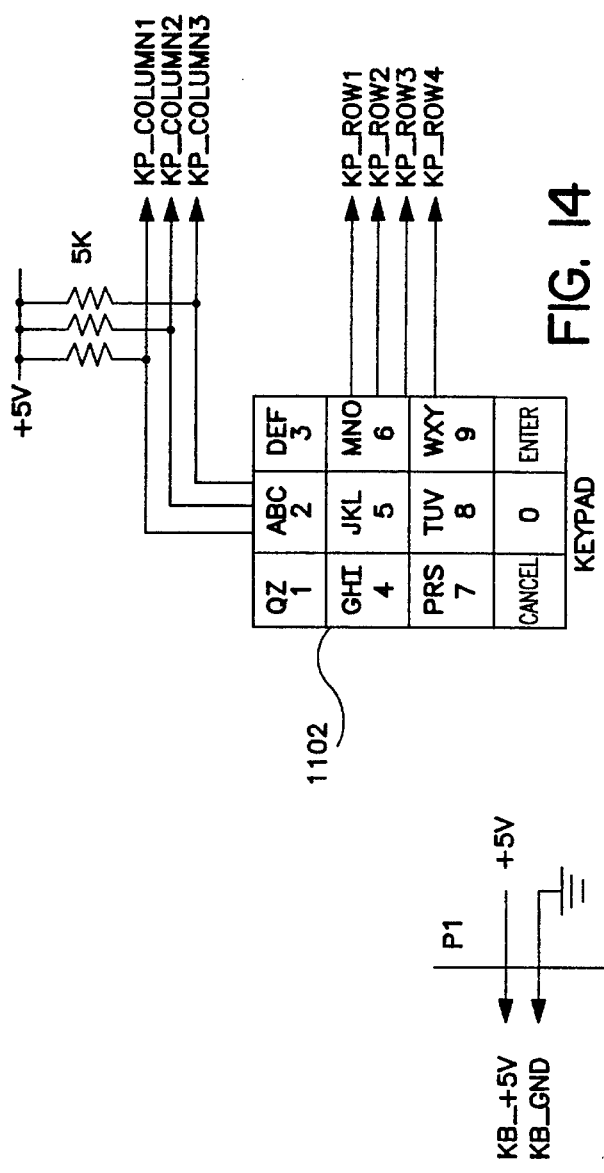
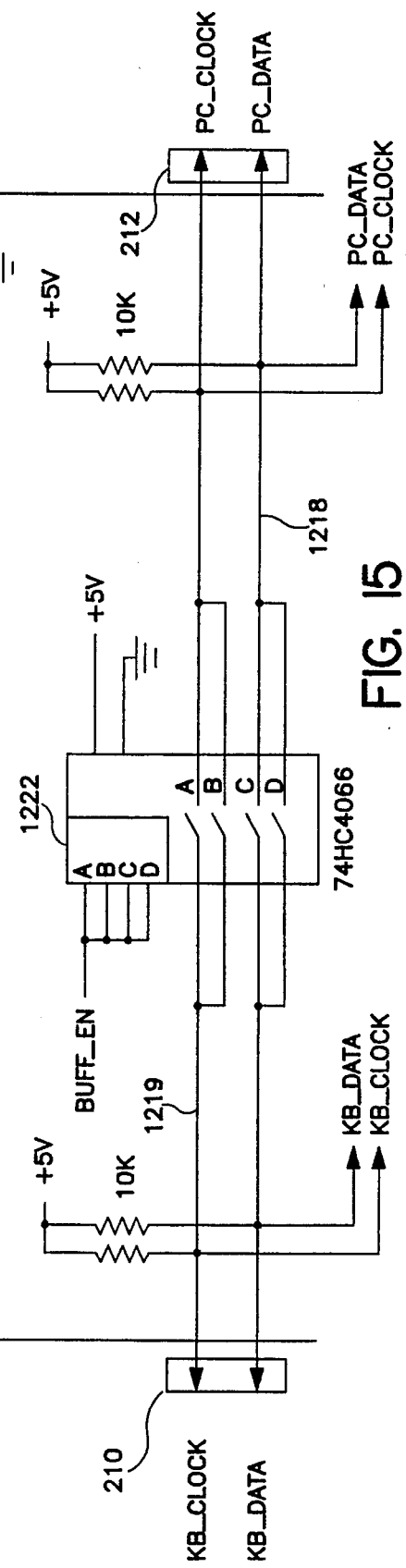
FIG. 14
FIG. 15

| SECTOR | LABEL |
|---|---|
| 1804 | CURRENT MODE REGISTER |
| 1806 | PREVIOUS MODE REGISTER |
| 1808 | PC INTERFACE TEMPORARY BUFFER |
| 1810 | DATA OUTPUT BUFFER |
| 1812 | COMMAND REGISTER |
| 1814 | PIN ENTRY BUFFER |
| 1816 | ENCRYPTED PIN HOLDING AREA |
| 1818 | PERSONAL ACCOUNT NUMBER |
| 1820 | CHANNEL 1 CARD SWIPE DATA BUFFER |
| 1822 | CHANNEL 2 CARD SWIPE DATA BUFFER |
| 1824 | SWIPE TIMEOUT COUNTER |
| 1826 | SWIPE TIMER DATA |
| 1828 | SWIPE BUFFER FULL FLAG |
| 1830 | CURRENT KEY POINTER |
| 1832 | KEY POINTER SHIFT REGISTER |
| 1834 | CRYPTO REGISTER |
| 1836 | KEY REGISTER |

FIG. 18

ROM:

INTERRUPT VECTORS

OPERATIONAL PROGRAM

1902

| SECTOR | LABEL | |
|---|---|---|
| 2004 | FUTURE ENCRYPTION KEYS | USED |
| 2006 | INITIAL KEY SERIAL NUMBER | FOR |
| 2008 | ENCRYPTION COUNTER | ENCRYPTION |

2002

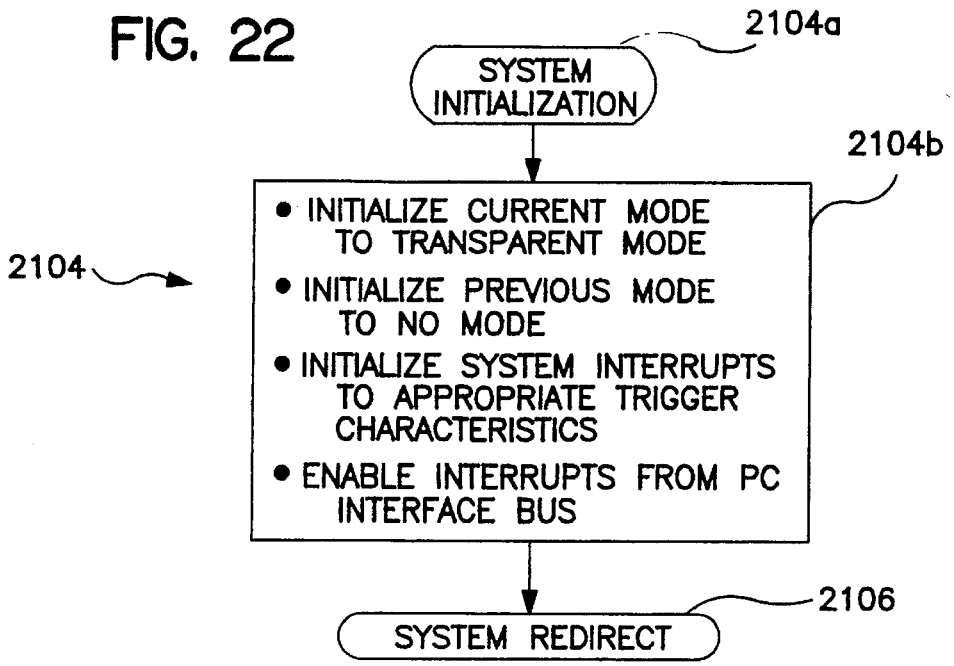
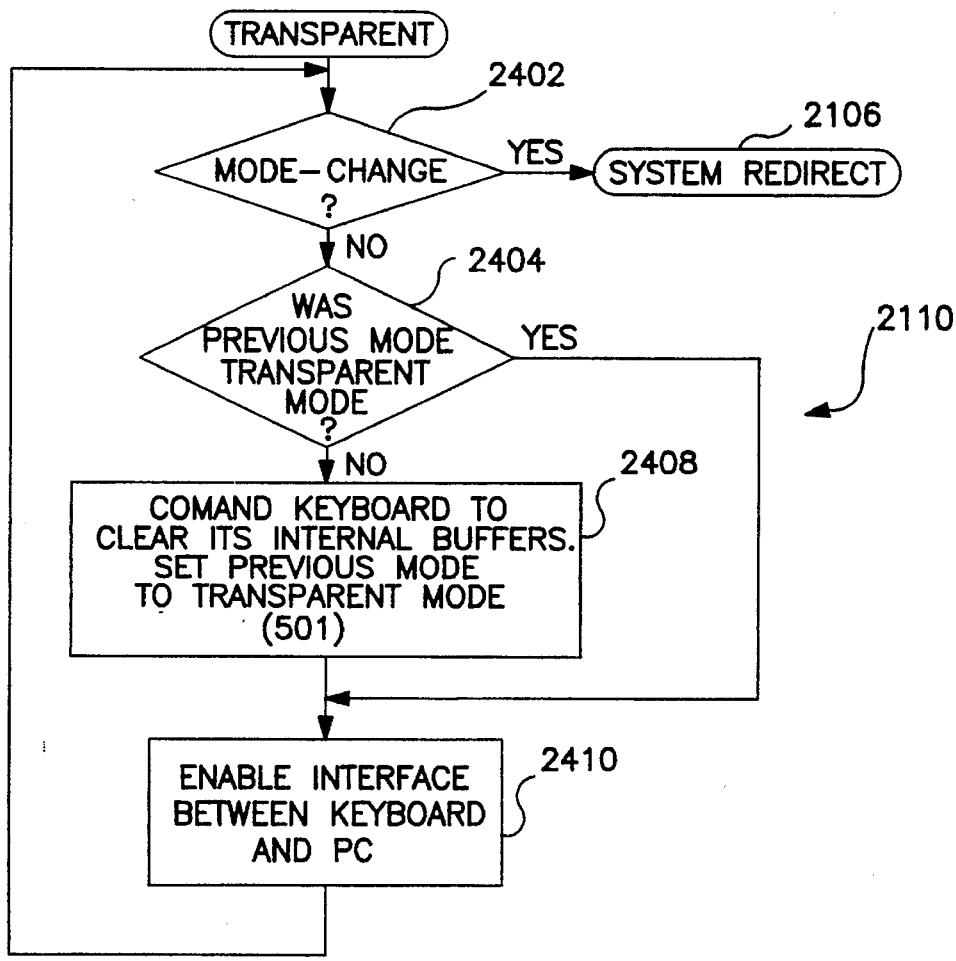

METHODS AND APPARATUS FOR INTERFACING AN ENCRYPTION MODULE WITH A PERSONAL COMPUTER

TECHNICAL FIELD

The present invention relates, generally, to methods and apparatus for remotely effecting a financial transaction and, more particularly, to a technique for transmitting encrypted data to a host computer from a remote personal computer.

BACKGROUND ART AND TECHNICAL PROBLEMS

Systems for performing financial transactions from a remote location, e.g., the home, office, or retail facility, are becoming increasingly popular. The proliferation of personal computers, and particularly in conjunction with modems, permits a consumer to effect bill paying, retail purchasing, banking, and other commercial transactions remotely, thus avoiding the need to travel to attend to routine commercial matters.

Presently known systems typically comprise a host computer located at a central data processing site, which is configured to communicate with a large number of remote personal computers (PC). When an individual desires to effect a financial transaction, for example to order merchandise and pay for the merchandise with a credit card, the user constructs a data link between his PC and the host computer via the PC's modem. Upon ordering the appropriate merchandise, the user may enter a credit card number corresponding to the account to which the merchandise is to be charged. The purchase request is then transmitted from the PC to the host computer, whereupon the transaction is verified by the host computer.

Presently known systems are limited, for example in their ability to effect the real time transfer of funds, due to various problems associated with the transmission of encrypted data. More particularly, real time transfers of funds are typically effected through the use of an automatic teller machine (ATM). In a typical ATM transaction, the user enters an account number onto a keypad or, alternatively, inserts a bank card into the ATM whereupon the account information is "read" from the magnetic strip located on the back of the bank card. Thereafter, the user enters a personal identification number (PIN) into the keypad to enable the transaction. By properly entering the PIN associated with the bank card, the fraudulent use of such cards is greatly reduced. The extension of the aforementioned ATM paradigm to home use is problematic, however, in that presently, known systems for remotely transmitting encrypted data (e.g. PINs) are unsatisfactory.

More particularly, although techniques for encrypting PINs and other confidential data and information are generally well known, current banking and other financial industry regulations are calculated to limit the extent to which confidential data may be transmitted in an non-encrypted form. In the context of a personal computer used to remotely effect a commercial transaction, it is possible to encrypt the confidential data at the PC and thereafter transmit the encrypted data to the host computer. However, presently known systems generally require that the confidential data (e.g. PIN) be entered into the computer via the keyboard associated with the PC, whereupon the PC's processor controls the encryption process. Thus, the data is essentially transmitted from the keyboard to the PC mother board over the physical wires connecting the keyboard to the PC box. Thereafter, the unencrypted data, i.e., prior to completing the encrypting process, necessarily resides on the mother board, for example prior to and during the encryption process. It is believed that sophisticated electronic "listening" devices could thus be employed to detect the confidential data between the time it is entered into the keyboard by the user and the time at which encryption is complete.

A system is thus needed which overcomes the shortcomings of the prior art.

SUMMARY OF THE INVENTION

The present invention provides methods and apparatus for transmitting encrypted data which overcomes the shortcomings of the prior art.

In accordance with one aspect of the present invention, the system for transmitting encrypted data comprises a host computer connected to a remote data processing device (e.g. PC) which includes a keyboard or other suitable mechanism for entering confidential data into the remote device. In accordance with a first embodiment of the invention, the remote processing device comprises a conventional personal computer having an alphanumeric keyboard connected thereto via a conventional electronic wire, there being an encryption module interposed between the keyboard and the PC mother board. In accordance with this first embodiment, the encryption module comprises a keypad which permits the user to directly enter confidential data (e.g. PIN) into the encryption module. The encryption module thereafter encrypts the confidential data and transmits the encrypted data to the PC, whereupon the encrypted data may be transmitted to the host computer via modem. In this way, the data need not reside in the PC in an unencrypted form; moreover, the data is transmitted from the encryption module to the PC in an encrypted form, thereby reducing the risk that electronic "listening" devices may intercept the unencrypted data.

In accordance with a second embodiment of the present invention, the encryption circuitry is integrated into a keyboard associated with a PC, such that confidential data may be encrypted in the keyboard itself such that the confidential data is transmitted to the PC and manipulated by the PC in an encrypted form.

In accordance with the third embodiment of the present invention, a self contained, stand alone transaction module comprises a processor having an integral keypad associated therewith, such that confidential data may be entered into the keypad and encrypted within a single, integral unit, thus avoiding the need for transmission wires between a remote keypad and the encryption processing circuitry.

In accordance with the further aspect of the invention, the encryption module may be equipped with various peripheral devices useful in entering data and information, for example magnetic head card readers, "smart card" or integrated circuit card (ICC) readers, bar code readers, voice recognition devices, scanners, and the like. In this way, confidential data in virtually any medium may be entered into the encryption module and encrypted prior to subsequent processing and transmission, such that the potential for the unauthorized detection of the unencrypted data is minimized.

BRIEF DESCRIPTION OF THE DRAWING FIGURES

The present invention will hereinafter be described in conjunction with the appended drawing Figures, wherein like numerals designate like elements, and FIG. 1 is a schematic block diagram of a transaction authorization system in accordance with the present invention;

FIG. 14 is a schematic circuit diagram of the keypad shown in FIG. 2;

FIG. 15 is a schematic circuit diagram of an analog switch used in the encryption module of the present invention;

FIGS. 18–20 are schematic memory maps of various memory sectors associated with the processor of FIG. 13; and FIGS. 21–36 are flow chart diagrams setting forth various functional features of the encryption module of the present invention.

DETAILED DESCRIPTION OF PREFERRED EXEMPLARY EMBODIMENTS

Figure 1:
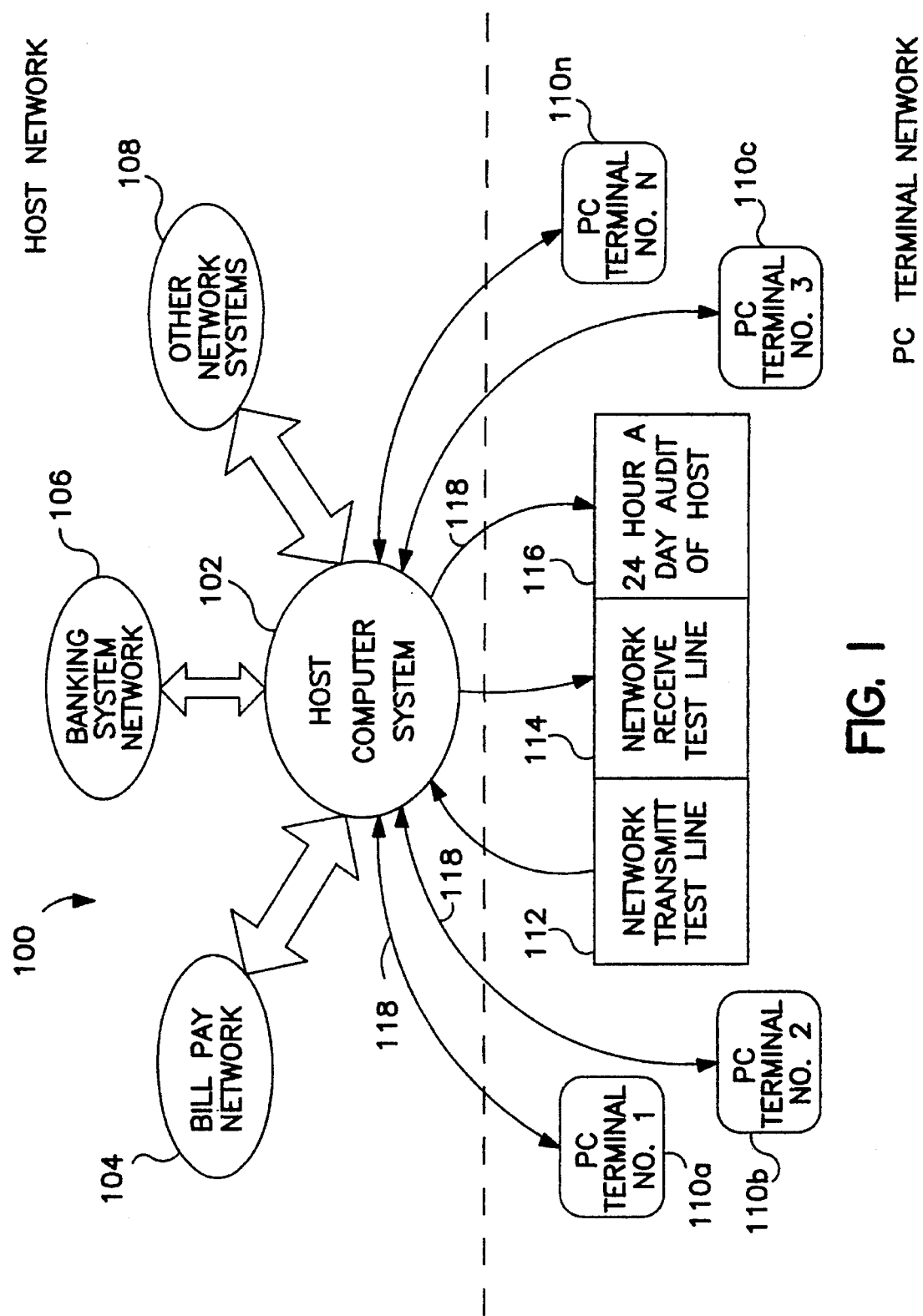

Referring now to FIG. 1, a remote transaction system 100 suitably comprises a host computer system 102 which may be interfaced with 1 or more transaction networks, for example a bill paying network 104, a banking system network 106, and various other network systems 108, for example state lottery purchase networks, retail shopping purchase networks, mail order purchase networks, and the like. Remote transaction system 100 further comprises a plurality of remote data processing terminals 110a–110n, for example a personal computer of the type typically used by a home consumer. Remote transaction system 100 may also comprise various diagnostic and maintenance apparatus, for example a network transmit test system 112 and a network transmit receive system 114 suitably utilized to periodically test the performance of host computer system 102, and an audit system 116 which permits the operator of system 100 to periodically audit the data and information resident within host computer 102.

As discussed in greater detail below, various networks 104–108 are suitably operated by independent entities which desire to conduct business and/or other transactions with various consumers through host computer 102, for example wherein each of respective PCs 110A–110N are conveniently disposed within a consumer's home, office, retail outlet, and the like.

In accordance with a preferred embodiment of the present invention, data, including confidential data, may be entered into one of respective PCs 110, and encrypted as discussed in greater detail below, the encrypted data thereafter being transmitted from the PC to host computer 102 along a suitable data link 118. In accordance with one aspect of the invention, data link 118 may comprise a transmission wire (e.g. a telephone line, fiber optic cable, or the like) or alternatively may comprise a wireless link, for example microwave, RF or other suitable data transmission medium.

Figure 2:
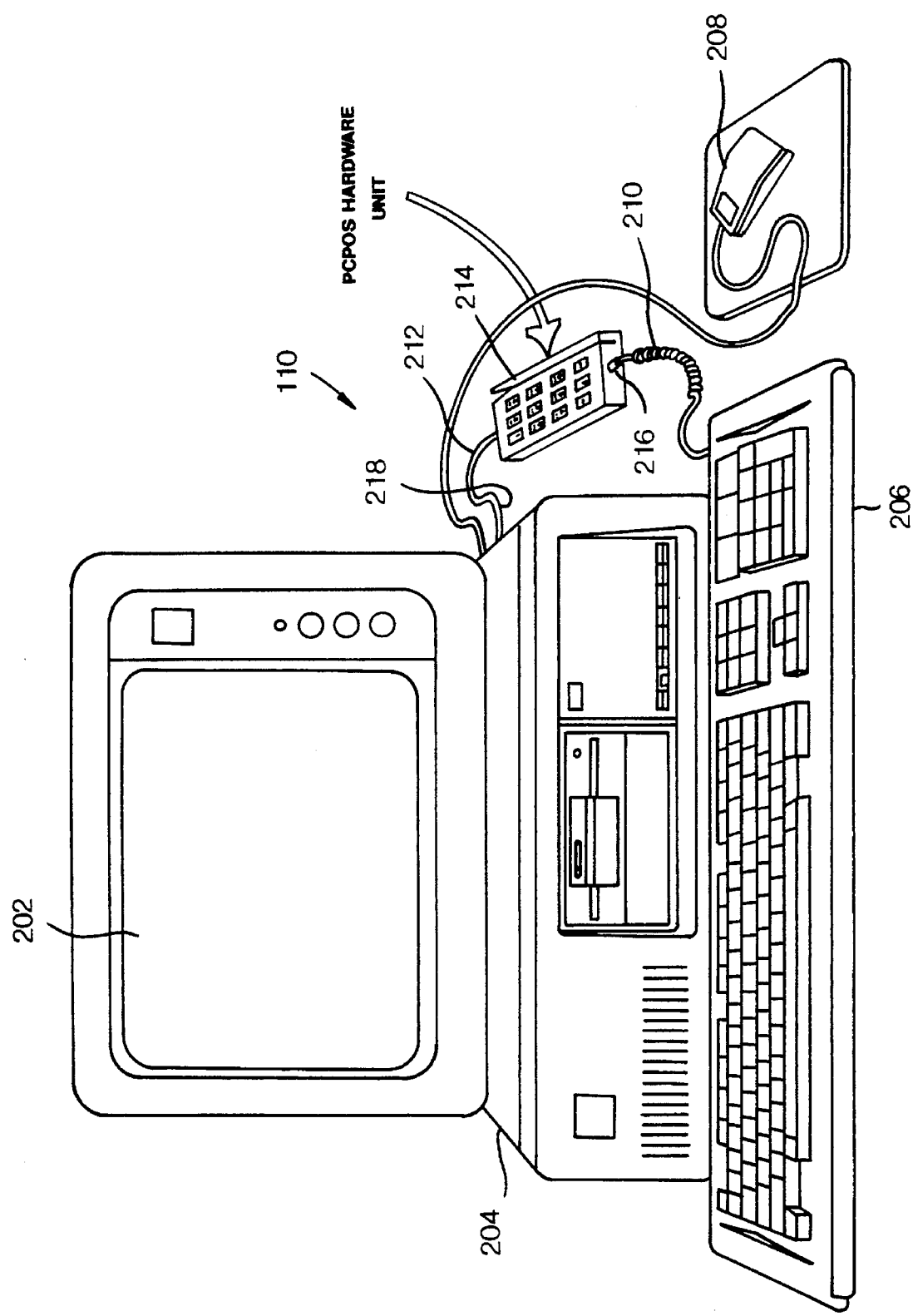
FIG. 2 is a front elevation view of a personal computer having an encryption module integrated therewith.

Referring now to FIG. 2, in accordance with a preferred embodiment of the present invention, an exemplary PC 110 suitably comprises a screen 202, a box 204 for housing, inter alia, the computing circuitry associated with PC 110, a keyboard 206 connected to box 204 via a connector 210, and a mouse 208 useful in executing interactive programs. In a first preferred embodiment of the present invention, an encryption module 214 may be conveniently interposed between keyboard 206 and box 204, for example in series with connector 210. In the illustrated embodiment, module 214 suitably comprises a module connector 212 configured to permit easy installation of module 214. More particularly, a distal end 216 of connection 210 is normally plugged into a mating connector (not shown) on box 204 during normal operation of the PC. When it is desired to install module 214, connector end 216 may simply be detached from box 204, and a distal end 218 of connector 212 connected to box 204 at the same site. Distal end 216 of connector 210 is suitably connected to module 214, for example in much the same manner as distal end 216 would otherwise be connected to box 204. In this way, module 214 may be conveniently interposed between keyboard 206 and box 204 without opening box 204, a procedure not readily acceptable to most computer users.

In an alternate embodiment of the subject invention, the encryption circuitry and various of the peripheral devices discussed herein associated with module 214 may be conveniently incorporated into keyboard 206 during manufacture or retrofit, thus avoiding the need for at least the keypad portion of module 214.

Figure 3:
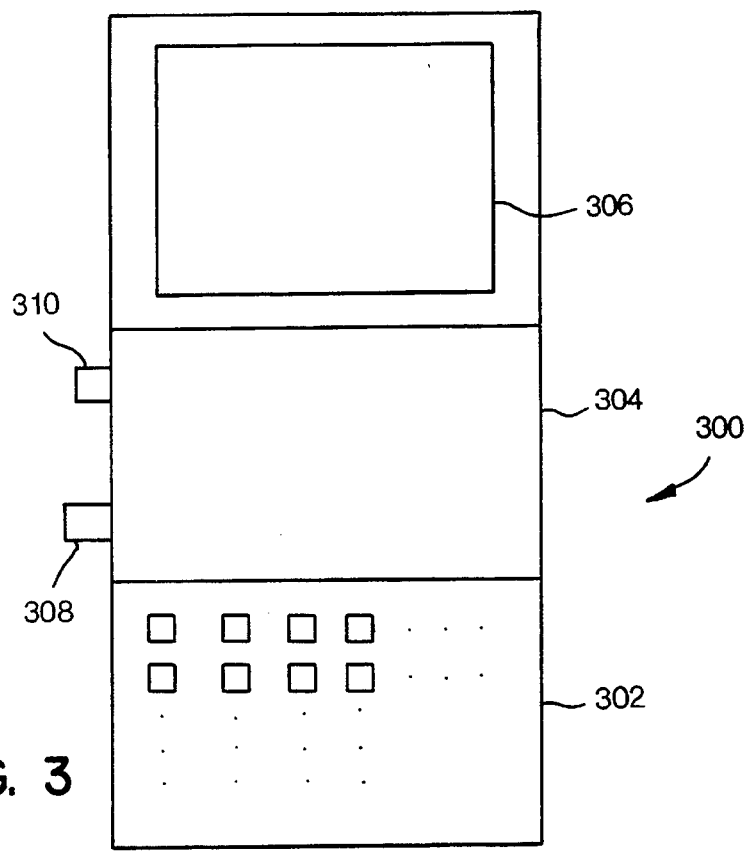
FIG. 3 is a schematic block diagram of an integral encryption module.

With momentary reference to FIG. 3, yet a further alternative embodiment suitably comprises a self contained, integral module 300 including a screen 306, a computer 304, a keyboard 302, a modem connection 308, and an accessory connector 310 for interfacing module 300 with various preferred devices, for example bar code readers, smart card readers, magnetic strip readers and the like. In accordance with the embodiment in FIG. 3, only those components necessary to effect the specific functions discussed need be incorporated into module 300 resulting in substantial cost savings over the PC embodiment shown in FIG. 2. However, it will be appreciated that, for those consumers who already own a PC, the embodiment illustrated in FIG. 2 may be preferable inasmuch as a conventional PC may be readily adapted in accordance with the present invention by incorporating module 214 into PC 110.

Referring now to FIGS. 4–10, an exemplary remote transaction application program useful in accordance with the present invention will now be described.

Figure 4:
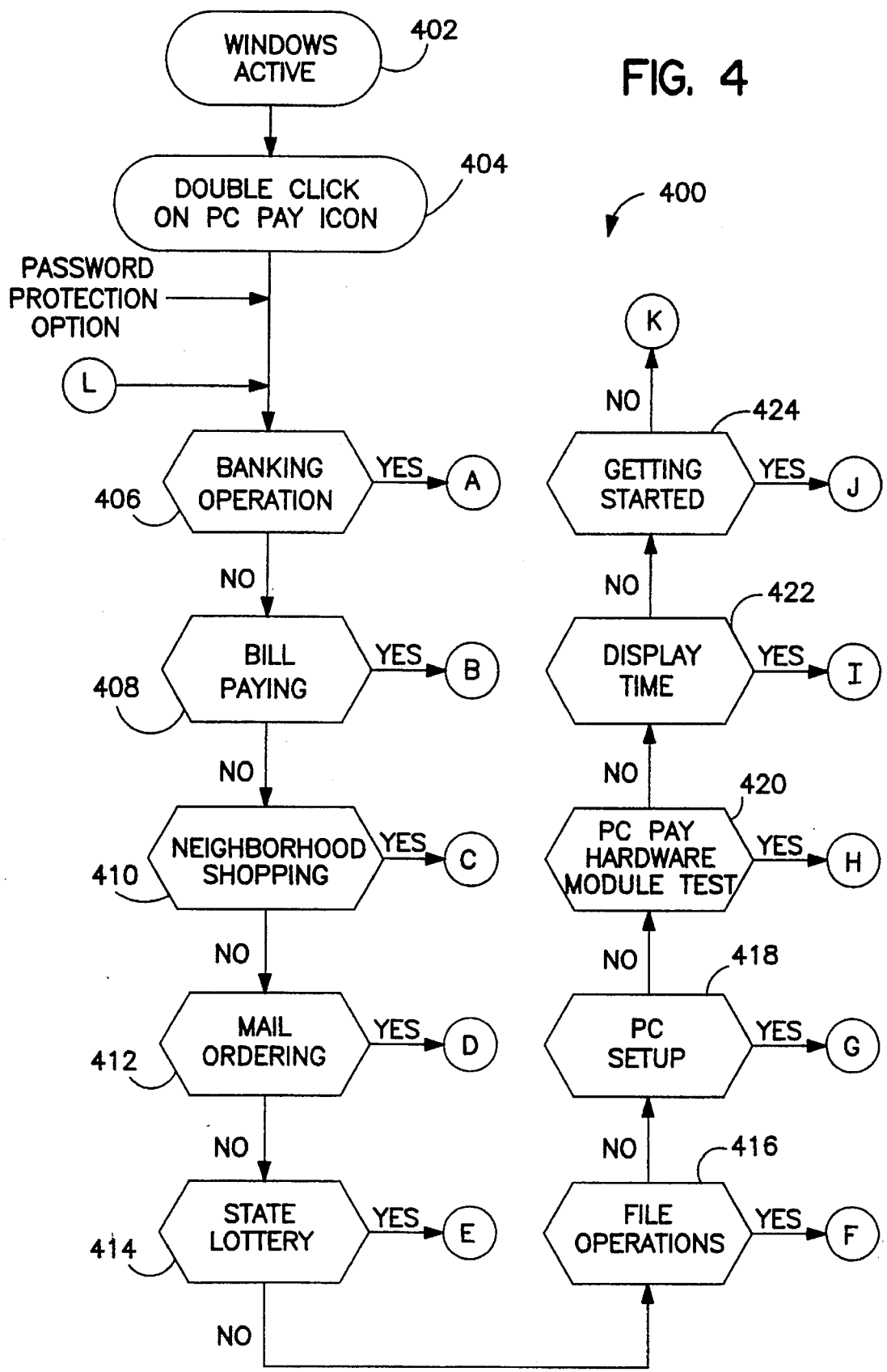
FIGS. 4 and 6–10 are flow charts setting forth the operation of an exemplary application program executed by the PC of FIG. 2 in accordance with the present invention.

With particular reference to FIG. 4, a suitable application program may be executed using a (WINDOWS) format which presents the user with various menu selections. Those skilled in the art will appreciate that the user may select various options using keyboard 206 or mouse 208 (see FIG. 2) as is known in the art. Although the subject application program is described herein in the context of the WIN- DOWS embodiment, it will be appreciated that the subject invention may be implemented in the context of any convenient applications environment.

Figure 5:
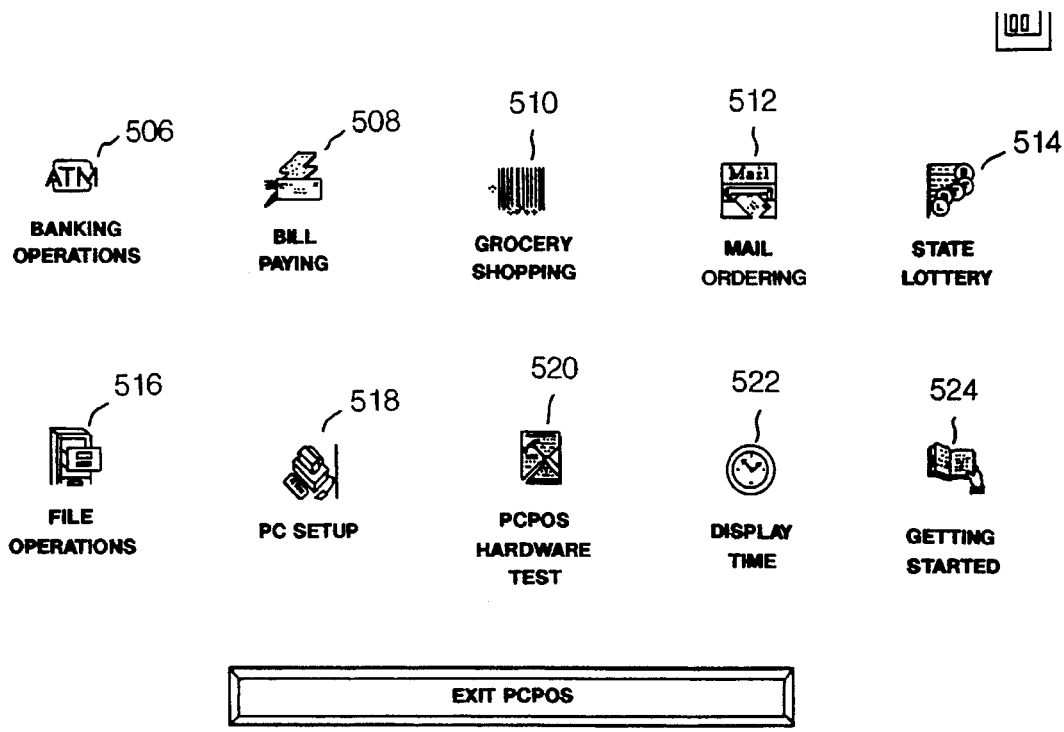
FIG. 5 is a display of various icons useful in conjunction with the software shown in FIG. 4.

With continued reference to FIG. 4, upon activating the WINDOWS capability of PC 110 (Step 402), the user may select one of a plurality of menu options 406–416, for example by double clicking mouse 208 (Step 404). More particularly and with momentary reference to FIG. 5, the user may select banking operation 406 corresponding to icon 506, a bill paying operation 408 represented by icon 508, a neighborhood shopping operation 410 represented by icon 510, a mail ordering operation 412 represented by icon 512, a state lottery operation 414 represented by icon 514, a file operations 416 corresponding to 516, a PC setup operation 418 corresponding to icon 518, a hardware test operation 420 corresponding to icon 520, a display time operation 422 corresponding to icon 522, or a tutorial operation 424 represented by icon 524. Although the illustrated icons shown in FIG. 5 are useful in the context of the illustrated embodiment, it will be appreciated that any suitable icon or other mechanism for selecting various program options may be employed in the context of the present invention. Moreover, the menu options set forth in FIGS. 4 and 5 are merely exemplary; various combinations of the menu options shown in the Figures, alone or in combination with other menu options not set forth herein may also be employed in the context of the present invention.

With continued reference to FIG. 4, tutorial operation 424 suitably entails an explanation of the various menu options and an explanation of how to use the options. Display time option 422 suitably displays the system time in any desired format. Hardware test operation 420 is suitably configured to allow the user to verify the integrity of various hardware components and preferable devices useful in the context of the present invention.

Setup operation 418 suitably permits the user to configure various parameters associated with the operation of the system and methods discussed herein.

File operation 416 suitably allows the user to manipulate various data structures useful in the context of the present invention.

Lottery operation 414 may be configured to permit the user to purchase lottery tickets for example via modem from his state of residence or from any other state or municipality, depending on the regulation governing the sale of such tickets.

Mail ordering operation 412 suitably entails procedures for ordering merchandise from PC 110, for example from a mail order catalog. In this regard, module 214 (see FIG. 2) or, alternatively, box 204 may be suitably equipped with a bar code reader so that merchandise may be automatically selected by scanning bar code associated with the merchandise. The same bar code technique may also be employed in the context of shopping operation 410, which suitably entails procedures for permitting a user to order various products e.g. grocery products, by entering of the ordered item into PC 110.

In accordance with the further aspect of the invention, neighborhood shopping operation 410 may be further implemented with the use of a bar code reader in the following manner.

Various consumer products are typically equipped with a UPC label, bar code, or other indicia representing the particular product. A bar code reader assembly (not shown), for example a hand held wand, may be suitably used by the consumer to enter into a memory array associated with the bar code reader products which the consumer desires to purchase, for example from a grocery store. After accumulating products which the consumer desires to purchase for a period of time. The product in digit stored in the bar code reader memory may be "dumped" into an appropriate memory location in PC 110 during the operation of, for example, shopping operation 410. In this way, the consumer may select the products to be purchased over a period of time, analogous to constructing a grocery list. When it is desired to purchase the items, indicia of the accumulated list may be transmitted via data link 118 (see FIG. 1) to host computer 102 whereupon a grocery network 108 retrieves the data and assembles the groceries for the consumer. If desired, the grocery store cooperating with grocery network 108 may deliver the grocery items to the consumer's residence, with the groceries being paid for in accordance with, inter alia, the principles set forth in bill paying operation 408 or banking operation 406 as described in greater detail below.

Figure 6:
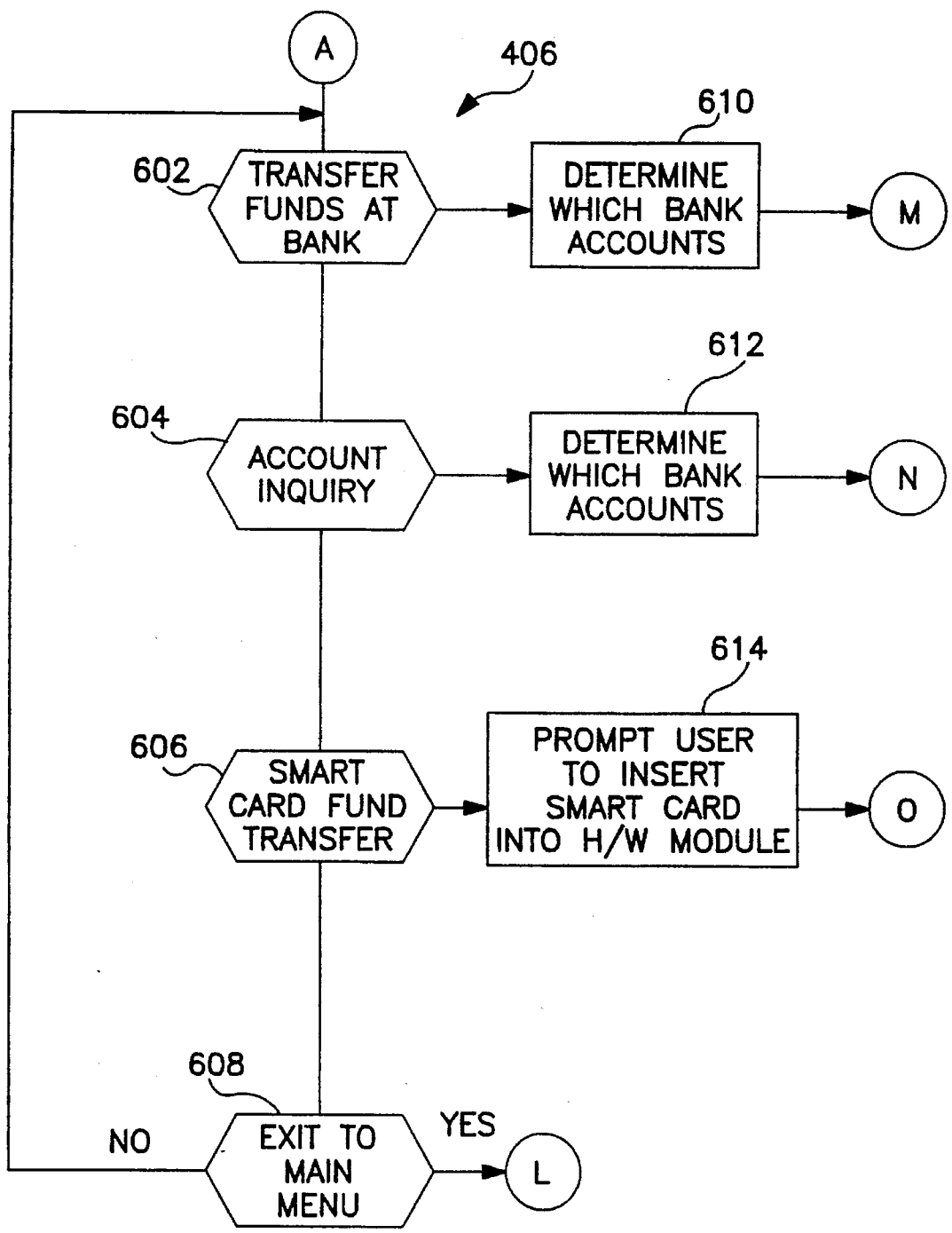

Referring now to FIGS. 4 and 6, banking operation 406 suitably permits the user to select one or more banking options, for example a funds transfer operation 602, and account inquiry operation 604, or a smart card funds transfer 606. In addition banking operation 406 may also permit the user to exit to the main menu 400 (Step 608).

Figure 7:
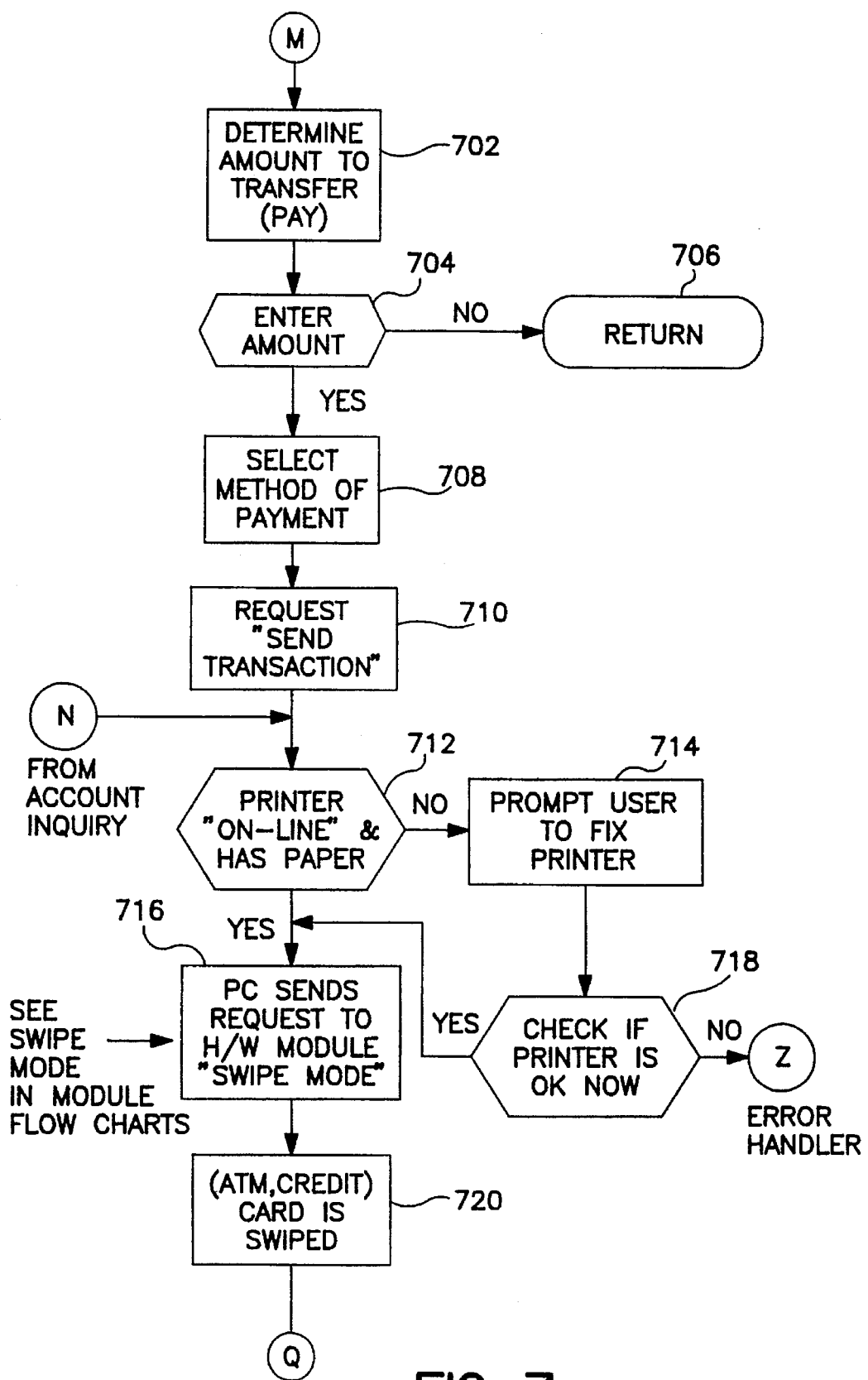

Referring now to FIGS. 6 and 7, funds transfer operation 602 suitably entails a selection of a particular bank account (Step 610), for example a savings account, checking account, money market account, and the like. When the account which the user desires to debit is selected, the system suitably prompts the user to enter an amount which is to be transferred or paid (Step 702), for example by entering an amount into PC 110 via keyboard 206 (704). If no amount is entered after a predetermined time or if an incorrect amount (e.g. "zero", a negative amount, or an amount which exceeds the predetermined threshold), the system may resume its previous processing path (Step 706). If a correct amount of funds to be paid or transferred is entered by the user, the user may be suitably prompted to select the method of payment (Step 708), whereupon a transaction request is suitably transmitted from PC 110 to module 214 (Step 710), as discussed in greater detail below.

In accordance with one aspect of the present invention, it may be desirable to permit particular transactions, e.g. transactions involving the transfer of money, only upon the satisfaction of certain threshold conditions. For example, it may be desirable to permit a funds transfer only if a receipt evidencing the transaction may be printed at a printer which is located proximate PC 110.

More particularly and with continued reference to FIG. 7, the system may be suitably configured to confirm: (1) whether PC 110 is equipped with or otherwise has access to a local printer; and (2) that the aforementioned printer is equipped with paper upon which a receipt may be printed (Step 712).

If PC 110 either does not have a printer associated with it or if it has a printer but the printer it out of paper, the system may prompt the user to install an appropriate printer and/or paper (Step 714), whereupon the system again checks to confirm the presence of a functional printer (Step 718). If a functional printer still is not detected, an appropriate error message is generated.

If it is determined that PC 110 has a functioning printer (loaded with paper) associated therewith, PC 110 is suitably configured to transmit a command to module 214 which causes module 214 to enter a "swipe" mode of operation (Step 716), discussed in greater detail below in conjunction with FIGS. 27 and 28. The user may thereafter enter the appropriate account data, for example by swiping a transaction card through a magnetic card reader, entering a smart card into a smart card reader associated with PC 110 entering account data via keyboard 206, or any other convenient mechanism for entering account data associated with PC 110 or modem 214 (Step 720).

Figure 8:
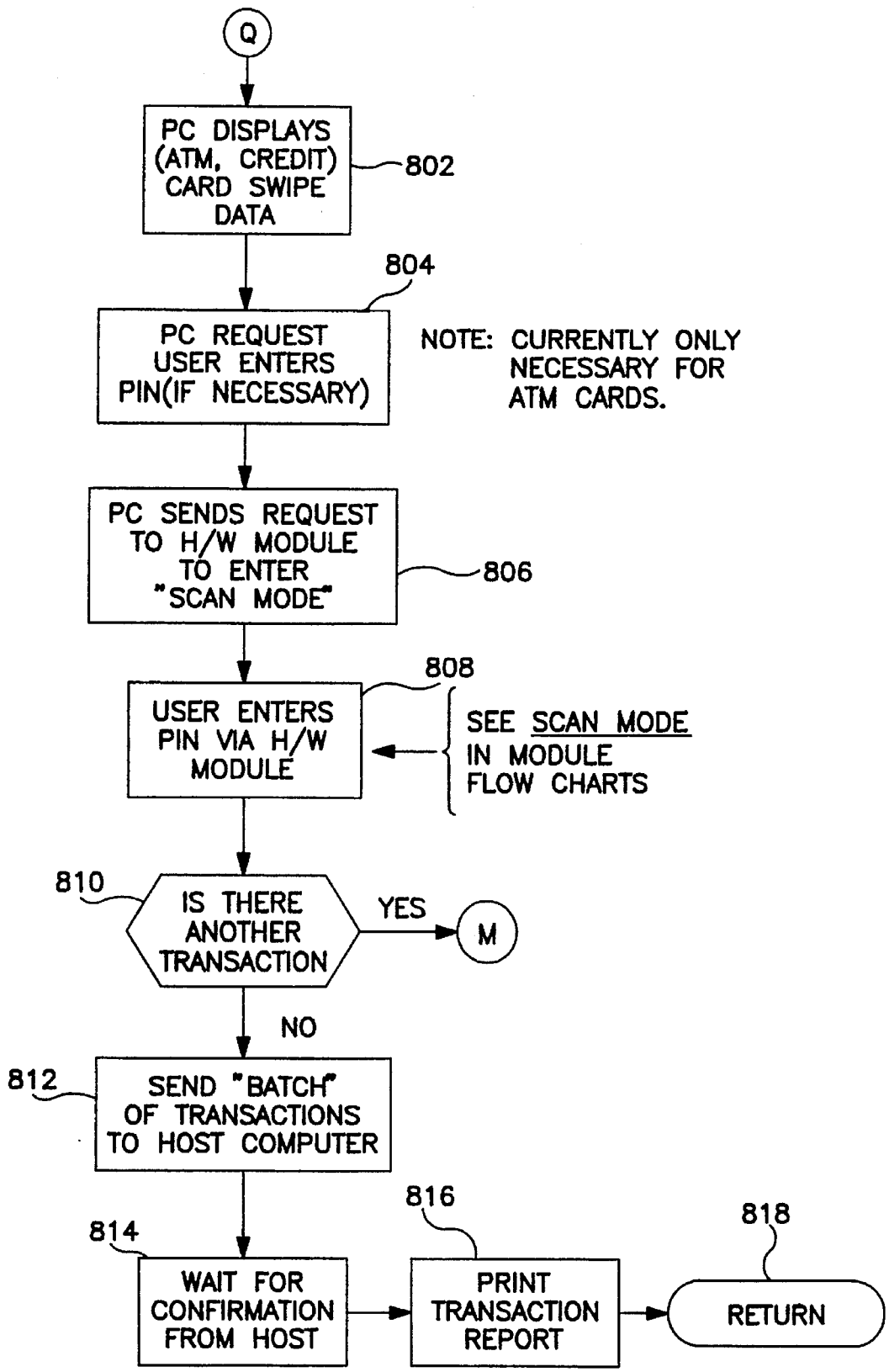

Referring now to FIG. 8, once the account data is entered, PC 110 may suitably be configured to display the account data on screen 202 (Step 802). The particular transaction being performed by the user is of a type which does not require the transmission of confidential data (e.g. PIN), the account data and the funds transfer/bill payment data discussed above may be assembled and transmitted to host computer 102 via data link 118 for processing (Step 812). If, on the other hand, the particular transaction requires the entry of confidential information, the system may be suitably configured to prompt the user to enter such confidential information (Step 804).

More particularly, in order to facilitate the entry, encryption and transmission of encrypted confidential data, PC 110 may be suitably configured to send a command signal to module 214 to place module 214 into a "scan" mode (Step 806), as discussed in greater detail below in conjunction with FIGS. 21 and 25. In accordance with the embodiment shown in FIG. 2, the user may then enter such confidential information via the keypad associated with module 214 or in the context of the embodiment shown in FIG. 3, via keypad 302. In the alternate embodiment discussed above wherein the encryption circuitry and/or software is integrated into keyboard 206, the user may enter the confidential information directly via keyboard 206. In any event, the manner in which module 214 (or module 300 in accordance with the embodiment shown in FIG. 3) receives, encrypts, and transmits the encrypted data is discussed more fully in conjunction with FIGS. 21–29.

Upon entering all the information necessary to reflect a particular transaction, the system may suitably prompt the user to determine whether the user desires to enter another transaction. If so, the system returns to Step 702; if no further transactions are desired, PC 110 suitably packages and transmits the transaction data to host computer 102 via data link 118. In this regard, any suitable mechanism for data transmission may be employed, for example a modem connected to box 204 or, alternatively, a modem connected directly to module 214 as discussed in greater detail below (Step 812).

Once host 102 has confirmed the transaction (Step 814), the printer (not shown) associated with PC 110 and discussed above suitably prints a transaction record (receipt) (Step 816), and the system again returns to main menu 400 (Step 818).

Returning now to FIG. 6, if the user desires to inquire as to an account balance and/or status (Step 604), the system may suitably be configured to prompt the user to select a particular account subject to inquiry (Steps 612), whereupon the system suitably returns to Step 712 (see FIG. 7).

If the user selects smart card fund transfer operation 606, the system may be suitably configured to prompt the user to insert a smart card into an appropriate smart card reader module (Step 614) (not shown).

Figure 9:
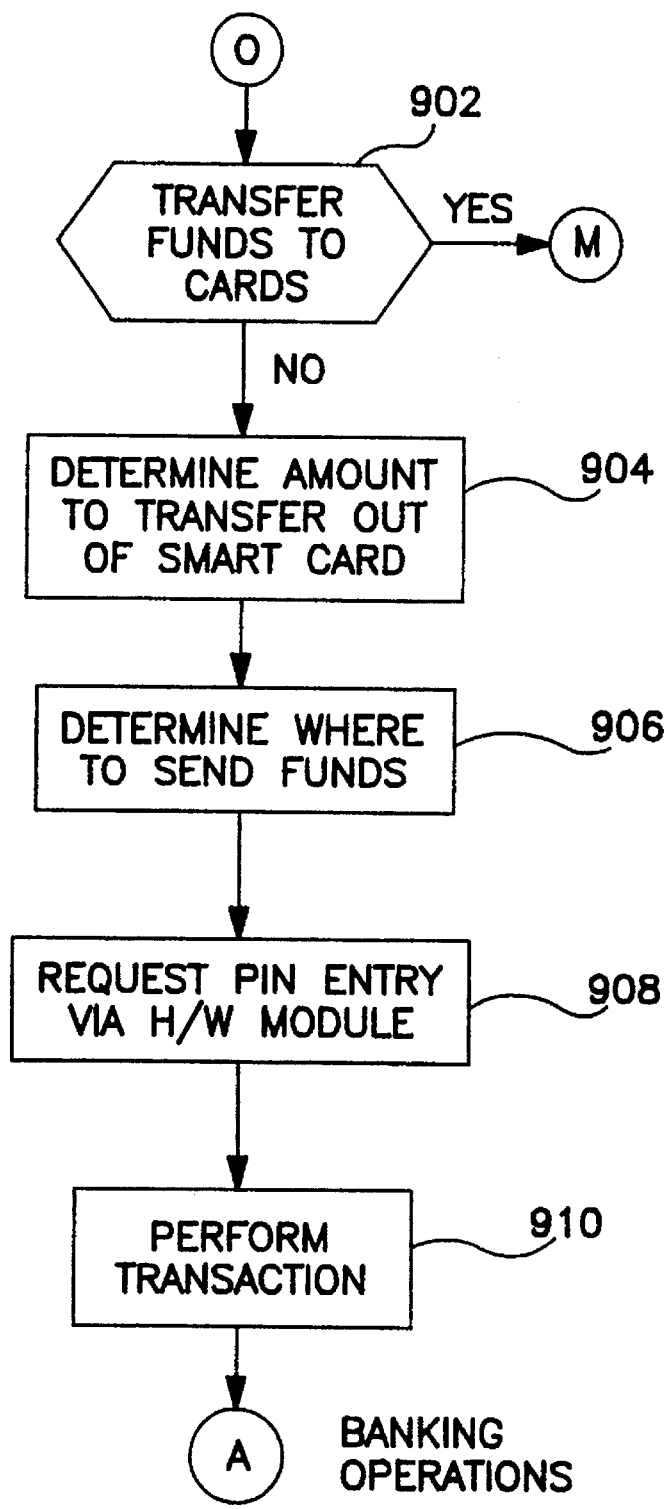
Figure 10:
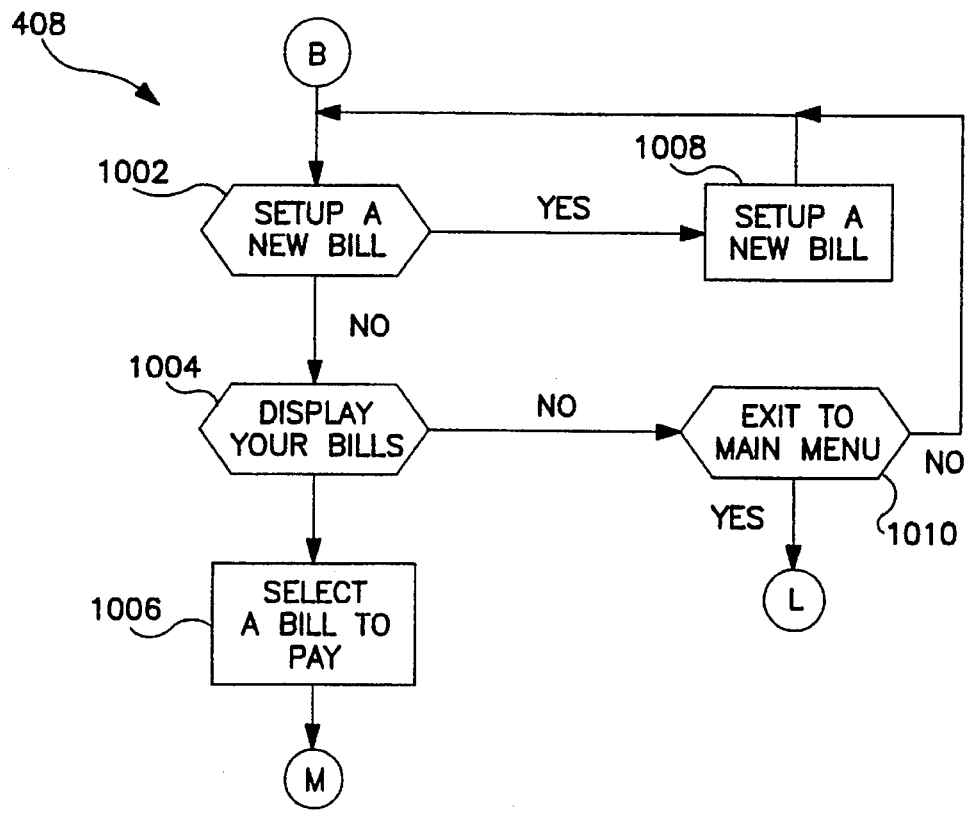

More particularly and with reference to FIG. 9, those skilled in the art will appreciate that integrated circuit cards (ICC), also known as smart cards, typically comprise a microprocessor embedded within the card, as well as an electronic mechanism for permitting data transfer to and from the card. That being the case, account information and, indeed, funds may be electronically "added" to or "subtracted" from the card by making appropriate modification to the data resident on the card.

With continued reference to FIG. 9, if the user desires to add funds to the smart card (Step 902), the system may be suitably configured to effect a process analogous to that set forth in FIG. 7; namely, the user may select an account from which funds are to be withdrawn and applied to the smart card, as well as the amount of funds to be so applied. The user may then be prompted to enter the smart card into a smart card reader/writer module (not shown) affiliated with either PC 110 or module 214 to effect the electronic update of the data resident on the smart card. In addition, the system may be configured to require a functioning printer as a prerequisite to effecting the foregoing smart card updating function, as desired.

If, on the other hand, the user desires to withdraw funds from the smart card (Step 904), the system may prompt the user to select the destination of the funds withdrawn from the smart card (Step 906), and to request the user to enter a PIN or other confidential data (Step 908). In this regard, the entry of such confidential information is suitably effected in a manner analogous to that described below in conjunction with FIGS. 11, 14, and 25–28. Upon entry of the PIN, the smart card transaction may be suitably affected via the smart card reader/writer circuit (not shown) associated with either PC 110 or module 214.

Referring once again to FIG. 4, upon the selection of bill paying operation 408, the system may be configured to prompt the user to add a new bill to the bill paying operation (Step 1002). More particularly, the bill paying function of the subject system suitably entails a method of keeping track of various bills, for example department store bills, credit card bills, utility bill, and the like in conjunction with PC 110. If the user desires to add a new billing entity to the billing operation, for example a new department store charge account, the data corresponding to the new account may be entered into PC 110 by the user (Step 1008), for example via keyboard 206.

The system may be further configured to display various bills comprising billing operation 408 (Step 1004), permitting the user to either exit to the main menu (Step 1010) or, alternatively, to select a particular bill for payment (Step 1006). Once a particular bill is selected for payment, the system is suitably configured to effect payment of the bill in accordance with the Steps described in conjunction with FIG. 7.

It will be appreciated that at various times during the execution of the foregoing application program, the users are required to enter various account, PIN, and other information and/or data into the system, for example via module 214. Thus, in accordance with one aspect of the present invention, module 214 may be suitably configured to assume a plurality of different modes, depending on the particular function then being effected. The circuitry comprising module 214 which permits module 214 to assume these various operational states will now be described, followed by a functional description of the various operational modes associated with module 214.

Figure 11:
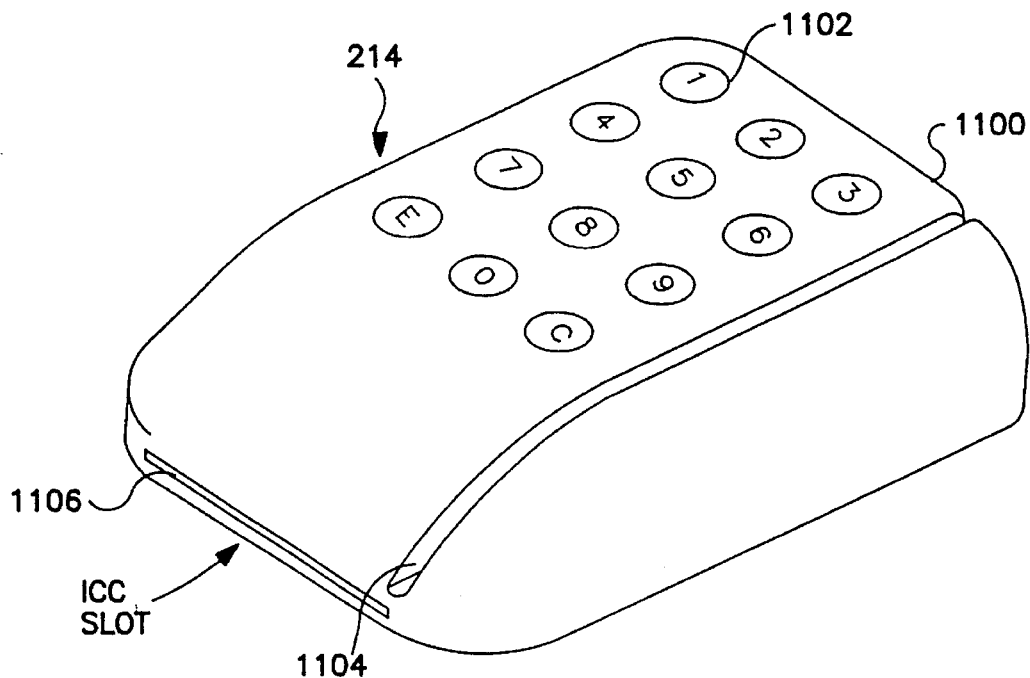
FIG. 11 is an alternate embodiment of the encryption module shown in FIG. 2.

With momentary reference to FIG. 11, module 214 may suitably assume any desired configuration, for example the sloping, contoured embodiment shown in FIG. 11. In particular, module 214 suitably comprises a housing 1100, for example an injection molded plastic housing similar to the conventional "mouse" typically employed in conjunction with personal computers. In accordance with the embodiment shown in FIG. 11, module 214 suitably comprises a keypad 1102, for example corresponding to the numbers 0–9, and further including inter alia, various functions, for example an enter (E) and cancel (C) button. Module 214 further comprises a card reader slot 1104 configured to receive transaction cards of the type bearing a magnetic strip, and an ICC (smart card) slot 1106 configured to accept a smart card into read and/or write data to/from the smart card.

Figure 12:
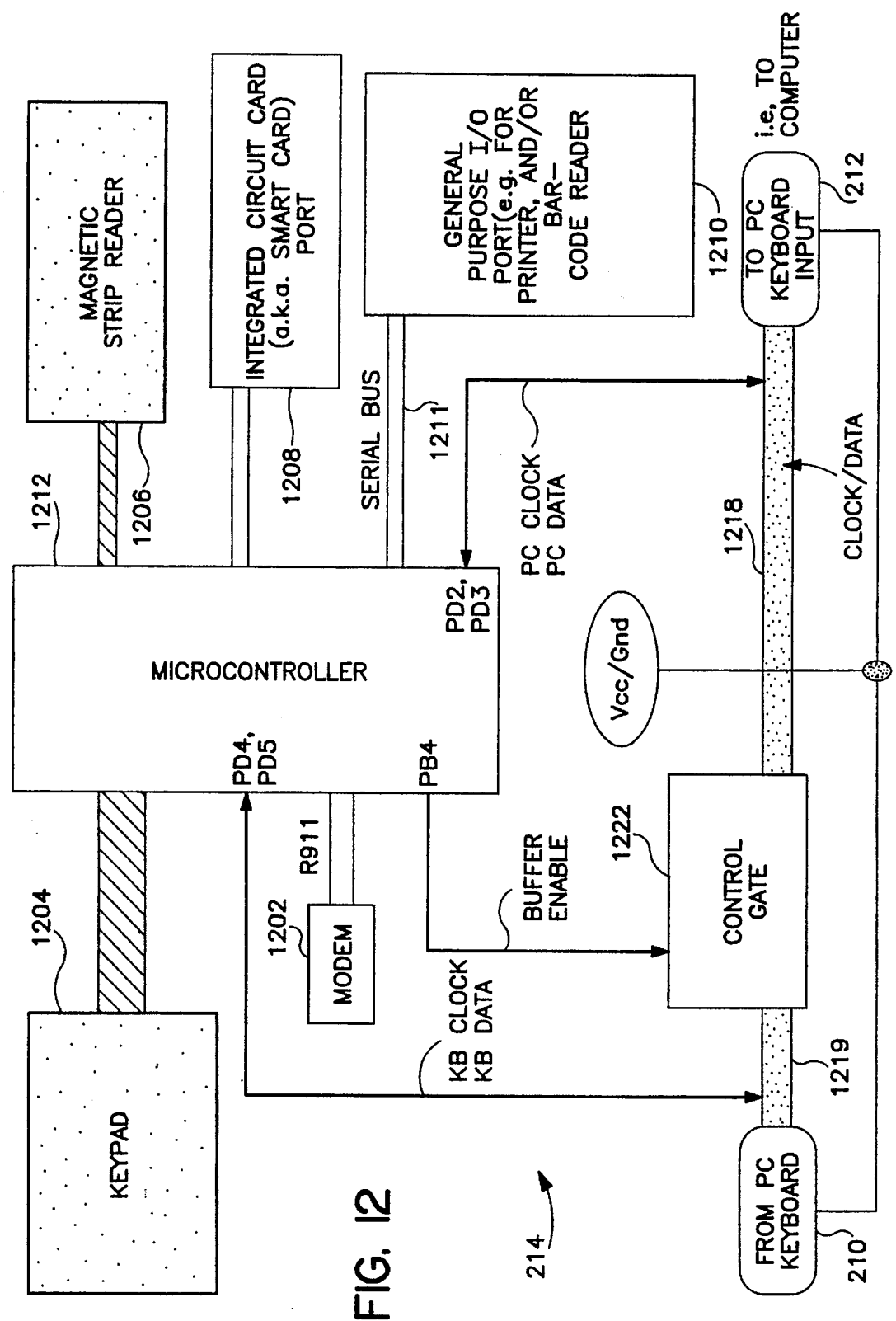
FIG. 12 is a schematic block diagram of the functional aspects of the encryption module of FIG. 2.

Referring now to FIG. 12, module 214 suitably comprises a keypad circuit 1204 associated with keypad 1102 (FIG. 11), a magnetic strip reader circuit 1206 associated with magnetic strip reader 1104, a microcontroller 1212, a modem 1202, a smart card reader circuit 1208 associated with ICC slot 1106, and a clock/data box 1218 configured to effect communication between microcontroller and box 204 via connector 212 as well as microcontroller and keyboard 206 via connector 210. In addition, module 214 suitably comprises a control gate for selectively establishing communication between module 214 and PC 110. With continued reference to FIG. 12 and further reference to FIG. 13, microprocessor 1212 suitably comprises a model MC68HC11E 9 microprocessor manufactured by Motorola, Inc. Processor 1212 suitably interfaces with a power circuit 1302 configured to apply 5 volts powered to $V_{DD}$, and an oscillator circuit 1304 configured to apply a predetermined clock pulse to a clock port 1308, for example at a frequency in the range of 4 MHZ to 12 MHZ, and to most preferably 8 MHZ. Processor 1212 further comprises a reset circuit 1306 configured to selectively apply a reset signal to a reset port 1310 of processor 1212.

In addition, processor 1212 is suitably equipped with the following input/output ports which, in the illustrated embodiment, are configured as follows:

| Port No. | Function |
| --- | --- |
| pa0 | card swipe input/output (channel 1) |
| pa1 | card swipe input/output (channel 2) |
| pa2 | modem interrupt |
| pa3 | read/write* |
| pa4 | ale |
| pa5 | cs |
| pa6 | output to "system validation" LED |
| pa7 | (smart card) read/write data |
| pb0 | keypad row 1 |
| pb1 | keypad row 2 |
| pb2 | keypad row 3 |
| pb3 | keypad row 4 |
| pb4 | buffer enable |
| pb5 | smart card clock |
| pb6 | smart card control |
| pc0 | d0 parallel data interface to modem |
| pc1 | d1 parallel data interface to modem |
| pc2 | d2 parallel data interface to modem |
| pc3 | d3 parallel data interface to modem |
| pc4 | d4 parallel data interface to modem |
| pc5 | d5 parallel data interface to modem |
| pc6 | d6 parallel data interface to modem |
| pc7 | d7 parallel data interface to modem |
| pd0, pd1 | interface to pentec bar code reader data loader |
| pd2 | pc clock |
| pd3 | pc data |
| pd4 | keyboard clock |
| pd5 | keyboard data |
| pe0 | keypad column 1 |
| pe1 | keypad column 2 |
| pe2 | keypad column 3 |

Figure 13:
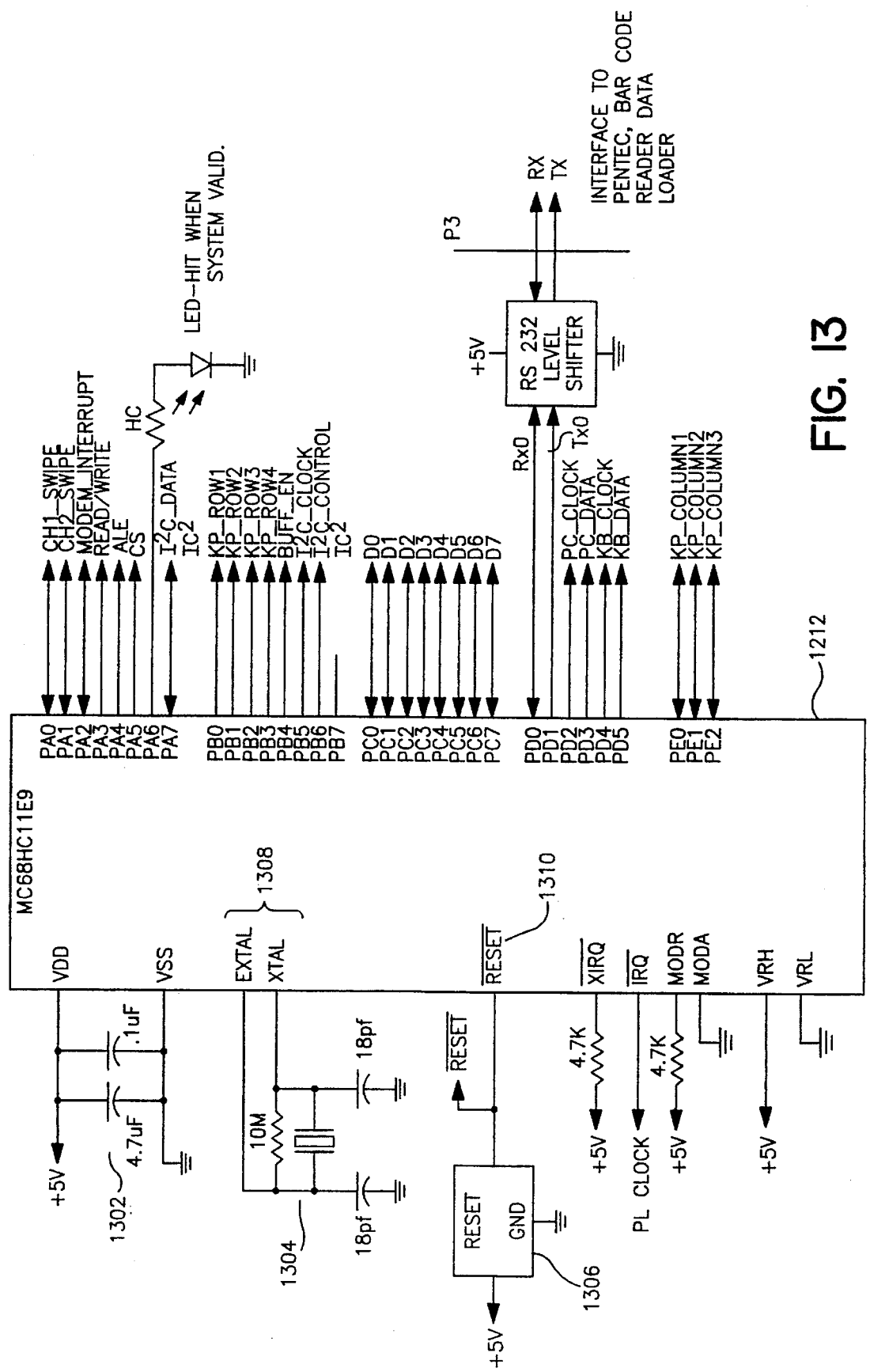
FIG. 13 is a schematic circuit diagram of the processor embodied in the encryption module of FIG. 2.

Referring now to FIGS. 12–14, keypad 1102 is suitably connected with the various ports associated processor 1212 as set forth in FIG. 14.

Refer now to FIGS. 12–13 and 15, control gate 1222 suitably comprises an analog switch, for example a module no. 74HC4066 manufactured by Motorola, Inc. Switch 1222 suitably comprises four internal switches a-d, which are suitably simultaneously controlled by the output of port pb4, such that internal switches a-d are either all open or all closed in accordance with the logic value of the output of port pb4. Generally speaking, in essentially all operational states of module 214, internal switches a-d will remain open, effectively isolating keyboard 206 from box 204. During the transparent mode (discussed below), internal switches a-d will typically remain closed, permitting normal communication between the keyboard and the PC.

With continued reference to FIGS. 12–13 and 15, the buffer enable signal from port pb4 of processor 1212 is suitably applied to control gate 1222. In addition, the keyboard clock and keyboard data signals are transmitted between ports pd4 and pd5, respectively, of microprocessor 1212 to a bus 1219 extending from switch 1222 to keyboard 206 via connector 210. Similarly, the PC clock and PC data signals are transmitted between ports pd2 and pd3, respectively, of microcontroller 1212 to a databus 1218 extending between control gate 1222 and box 204 (FIG. 1) via connector 212.

Figure 16:
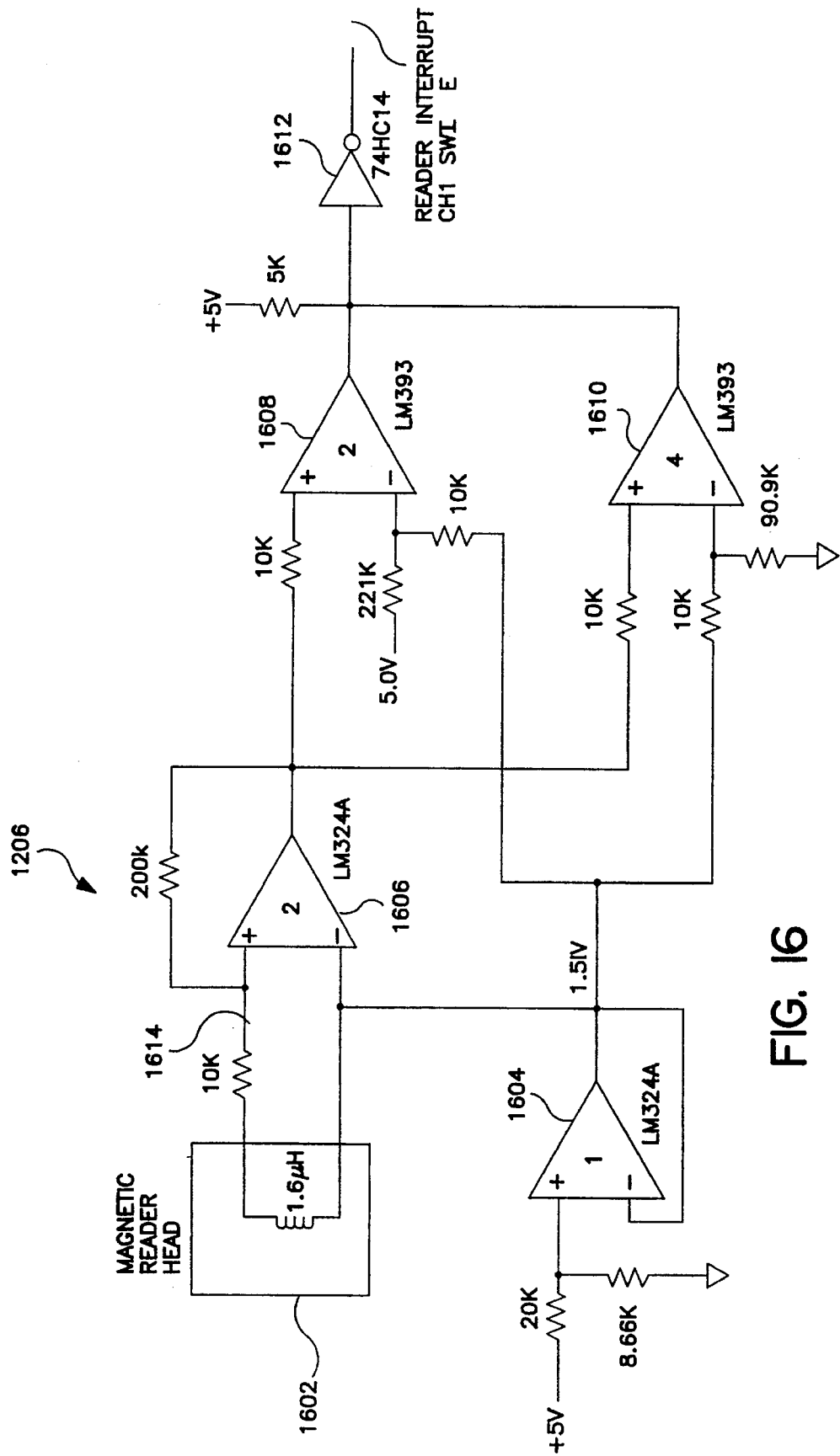
FIGS. 16 and 17 are schematic circuit diagrams of a magnetic strip reader circuit.

Referring now to FIGS. 12, 13 and 16, a first embodiment of magnetic strip reader circuit 1206 associated with magnetic strip reader 1104 (FIG. 11) suitably comprises a magnetic reader head 1602, for example a 1.6 microhenry inductor coil, respective first and second amplifiers 1604 and 1606, for example model no. LM324a operational amplifiers, respective comparators 1608 and 1610, for example model no. LM393, and an inverting schmidt trigger 1612, for example port no. 74HC14.

More particularly and with continued reference to FIG. 16, a transaction card of the type bearing a magnetic strip is suitably slid through magnetic strip reader 1104 of module 214 (FIG. 11) such that the magnetic strip magnetically engages reader head 1602. The output of coil 1602 is suitably applied to the inverting input of amplifier 1606 which suitably exhibits a gain on the order of 20. The output of amplifier 1604 is suitably applied to the non-inverting input of amplifier 1606. The output of amplifier 1606 is suitably applied to the non-inverting input of comparator 1608 and to the inverting input of comparator 1610. By applying a determined threshold voltage to the inverting input of amplifier 1608, and by also applying a predetermined threshold voltage to the non-inverting input of amplifier 1610, a series of logic hi and logic low pulses are applied to the input of schmidt trigger 1612, which inputs are effectively rectified, squared and sharpened into a binary square wave by the schmidt trigger/comparator combination. The output of schmidt trigger 1612 is a function of the output of coil 1602 and corresponds to the data which is magnetically encoded into the magnetic strip which is drawn through magnetic card reader 1104. The output of schmidt trigger 1612 corresponds to the channel 1 swipe data applied to port pa0 of processor 1212.

The magnetic head reader circuit of FIG. 16 is particularly useful in the context of cards bearing magnetic strips which comprise a single "track", or single column of magnetically encoded information. Alternatively, many magnetic strips of the type typically found on transaction cards comprise two or more separate magnetic columns embedded within the magnetic strip. In such cases, it may be desirable to employ dual magnetic reader coils in the context of card reader slot 1104.

Figure 17:
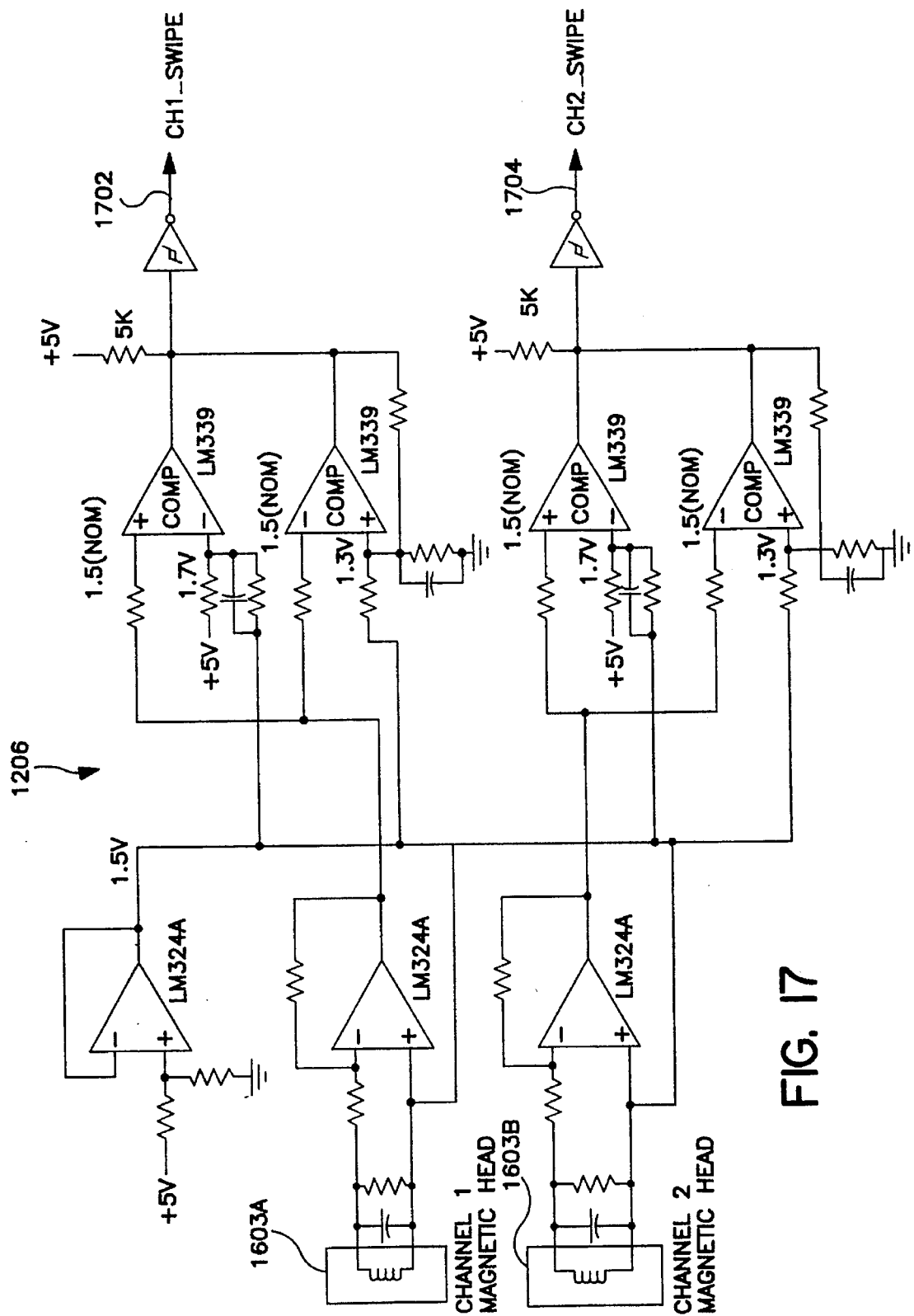

More particularly and referring now to FIG. 17, an alternate embodiment of circuit 1206 suitably comprises respective first and second reader coils 1603a and 1603b which are suitably configured to read the corresponding first and second magnetic rails (not shown) comprising the dual rail magnetic strip associated with a transaction card. In the alternative embodiment shown in FIG. 17, the circuit essentially comprises two of the circuits shown in FIG. 16 configured to generate respective outputs 1702 and 1704 which are suitably applied to respective ports pa0 and pa1 of processor 1212.

Figure 19:
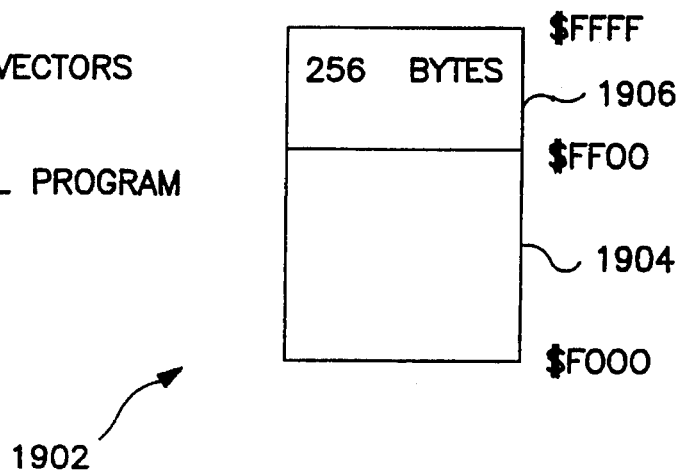
Figure 20:

Referring now to FIGS. 18–20 and with momentary reference to FIG. 12, microcontroller 1212 suitably comprises a random access memory (RAM) 1802, a read only memory (ROM) 1902 and an erasable electronically programmable read only memory (EEPROM) 2002.

More particularly, RAM 1802 suitably comprises, inter alia, respective memory sectors 1804–1836 corresponding to various addresses in RAM 1802. As discussed below in conjunction with the operational states of module 214, various predetermined data are suitably stored and retrieved in data sectors 1804–1836 during operation of module 214.

With continued reference to FIG. 19, the operating code (operational program) which controls the operation of module 214 is suitably stored in a first sector 1904 in ROM 1902. Moreover, various interrupt sectors, useful in the operation of module 214 are suitably stored in a second sector 1906 within ROM 1902.

Referring now to FIG. 20, EEPROM memory map 2002 suitably comprises non-volatile memory for use in storing encryption keys associated with the encryption algorithm employed in the context of the present invention to encrypt confidential data. More particularly, EEPROM 2002 suitably comprises a first sector 2004 corresponding to future encryption keys, a second sector 2006 corresponding to the serial number of the initial encryption key, and a third sector 2008 corresponding to an encryption counter.

In accordance with one aspect of the present invention, any suitable encryption algorithm may be employed by module 214, module 300, or PC 110 in the context of the present invention, which algorithm provides adequate security against unauthorized detection of the underlying confidential data.

Referring now to FIGS. 21–38, the operation of system 100, and particularly the operational states of module 214, will now be described.

Figure 21:
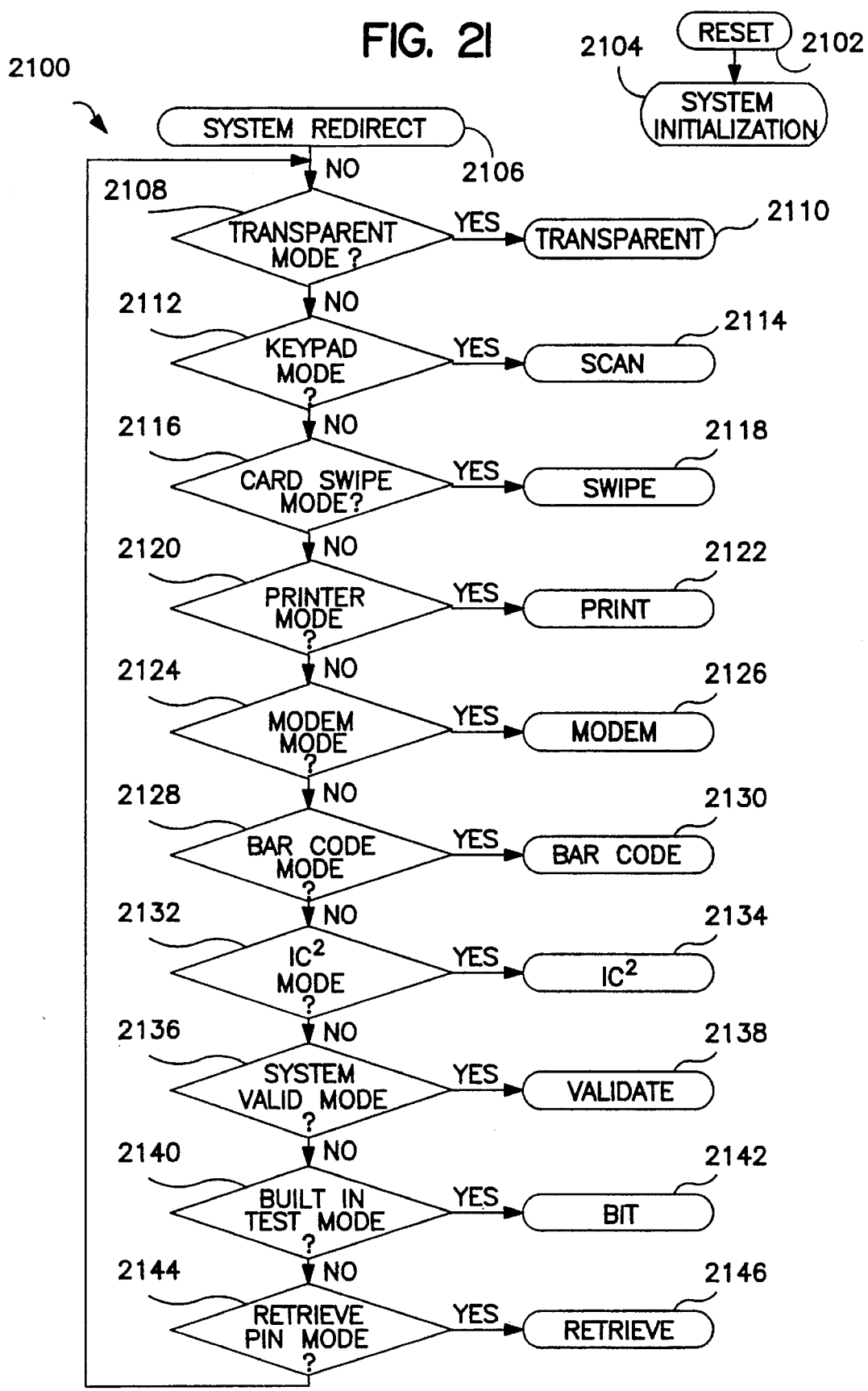

With particular reference to FIG. 21, upon powering up of module 214, a reset signal is applied to reset port 1310 of processor 1212 (Step 2102).

Upon entering the reset condition, system initialization is executed (Step 2104).

More particularly and with momentary reference to FIG. 22, system initialization Step 2104 suitably entails various initialization Steps (2104b), including, inter alia:

1. Initializing the current mode to transparent mode, for example by setting current mode register 1804 (see FIG. 18) to the transparent mode condition, as discussed in greater detail below;
2. Initializing previous mode register 1806 to "no mode";
3. Initializing the system interrupts to appropriate trigger characteristics;
4. Enabling interrupts from the PC interface bus (e.g. connector 212); and
5. Initializing the PC interface temporary buffer 1808 to "empty". The relevancy of the foregoing initialization steps are discussed in greater detail below in conjunction with ensuing description of the operation of module 214.

Upon completing system initialization, the system enters a system redirect state (Step 2106), whereupon the system then enters the appropriate operational mode; in the context of system startup, the system will default to transparent mode, as set forth above in conjunction with system initialization Step 2104(b).

More particularly, a preferred embodiment of the present invention employs an interrupt-based processing scheme within module 214. Thus, as the system flows through the main operational loop set forth in FIG. 21, the system will from time to time receive interrupts from PC 110. Upon receipt of a "mode change" interrupt command from PC 110, processor 1212 causes module 214 to terminate the then current mode, and enter system redirect (Step 2106), from which the appropriate new operational mode may be entered.

From the main control loop governing the operation of module 214 shown in FIG. 21, the system may enter any one of a number of operational states as a result of a number of predicate instructions. More particularly, the system may enter certain operational states as controlled by the executable code resident within sector 1904 of ROM 1902. In addition, the system may enter certain operational states as a result of commands received from PC 110, as set forth in more detail in conjunction with FIG. 23.

Figure 23:
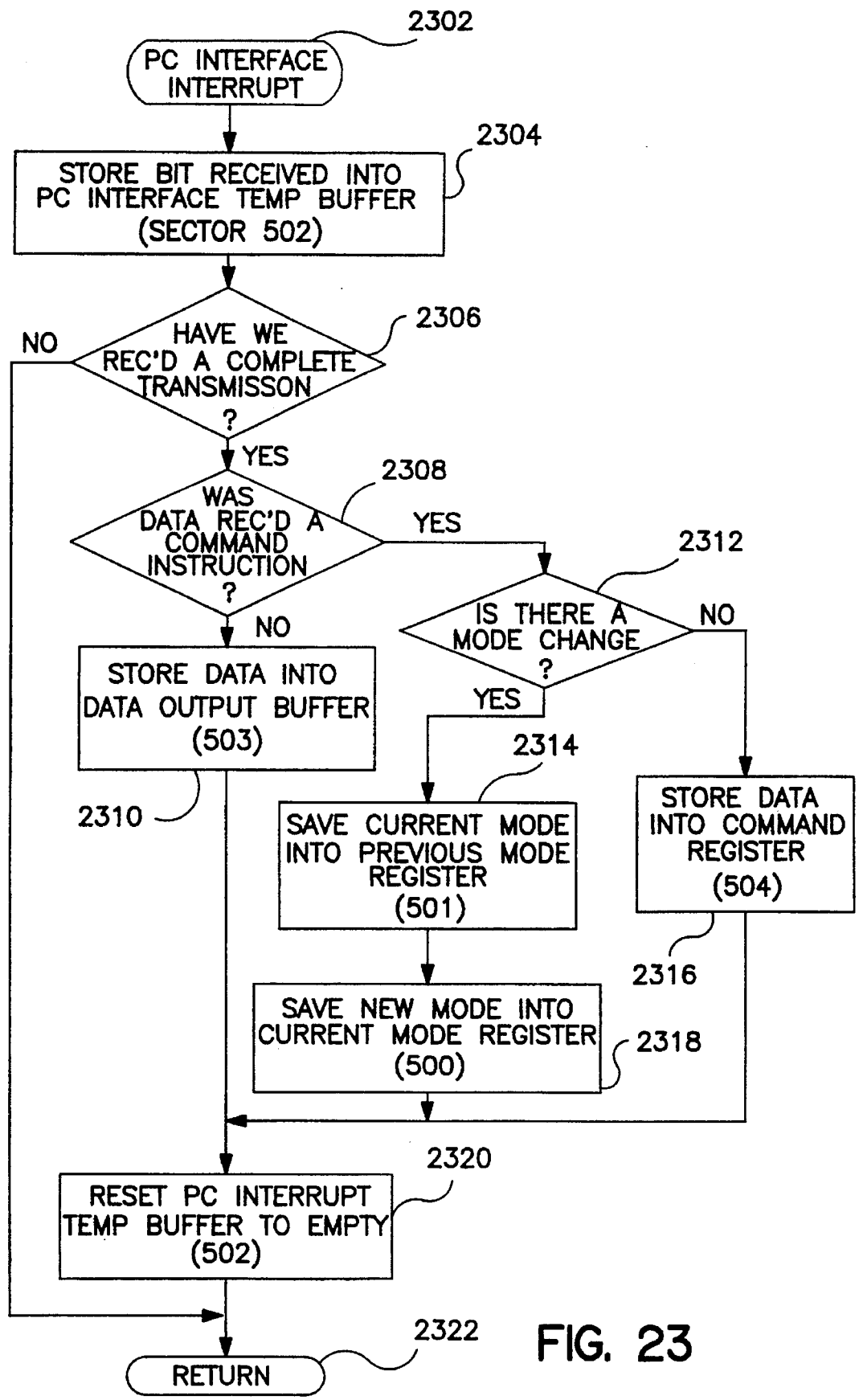

Referring now to FIG. 23, PC 110 from time to time sends interrupt commands to module 214 via connector 212 (Step 2302).

Upon receipt of a PC interrupt, the interrupt data packet received from PC 110 is suitably stored in sector 1808 of RAM 1802 (Step 2304). The system then determines if the complete message (interrupt data packet) was received from PC 110; if not, the system returns to main loop 2100. If a complete message is received at module 214, the system determines if the data corresponds to a command instruction or whether the message corresponds to other than a command instruction (Step 2308).

If the message corresponds to data other than a command instruction, the message is suitably stored in data output buffer 1810 of RAM 1802 (Step 2310), for subsequent processing, e.g., modem transmission to host computer 102. Thereafter, the contents of PC interface temporary buffer 1808 are reset to empty (Step 2320), then the system again returns to its pre-interrupt state (Step 2322).

Returning now to Step 2308 of FIG. 23, if the data received is a command instruction, the system determines if the command instruction corresponds to a mode change (Step 2312). If not, the data is stored in command register 1812 of RAM 1802 for possible subsequent use within the then current mode (Step 2316); the system then proceeds to Step 2320, as described above. If the message received from PC 110 corresponds to a mode change command ("Yes" branch from Step 2312), the then current mode is written into previous mode register 1806 (Step 2314), and the newly received mode is written into current mode register 1804 of RAM 802 (Step 2318). The system then proceeds to Step 2320, as described above.

With continued reference to FIG. 21, upon receipt of a message from PC 110, processor 1212 interrogates current mode register 1804 and, in accordance with the contents of register 1804, answers the appropriate operational mode from main loop 2100. In the context of startup operation, the system is suitably configured to enter transparent mode (Step 2110).

Referring now to FIG. 24, transparent mode 2110, just as with various other operational modes described below, determines whether a subsequent mode change has been received since entering transparent mode 2110 (Step 2402). If a mode change is received, the system enters the system redirect state (Step 2106); (see also FIG. 21) and enters the newly selected mode. If a mode change has not occurred, processor 2112 interrogates previous mode register 1806 to determine if the previous mode corresponds to transparent mode (Step 2404). If the previous mode corresponds to transparent mode, the system proceeds to Step 2410. If the previous mode was not transparent mode, the system commands the keyboard to clear its internal buffers and to set previous mode register 1806 to transparent (Step 2408). More particularly, if the previous mode was not transparent mode, it is possible that spurious keystrokes may have been entered into keyboard 206, which keyboard data may be stored in buffers internal to keyboard 206 and not shown in FIG. 2. In order to prevent data corresponding to these spurious keystrokes from being transmitted to PC 110, the keyboard internal buffers are cleared (Step 2408). Thereafter, the system enables the interface between keyboard 206 and PC 110 (Step 2410).

More particularly, and with reference to FIGS. 12, 13, and 15, Step 2410 of FIG. 24 suitably entails processor 1212 generating a buffer enable signal at port PB4, and transmitting the buffer enable signal to control gate (switch) 1222. In response, internal switches A-D of switch 1222 are closed, establishing direct communication between PC 110 and keyboard 206 through connector 212, bus 1218, switch 1222, bus 1219, and connector 210. Thereafter, the system continues to cycle through transparent mode 2110, permitting normal operation of keyboard 206 with respect to PC 110. The system will continue to cycle through transparent mode 2110 until a subsequent message is received from PC 110.

Returning now to FIG. 21, the system may also receive a command to enter scan mode (Step 2112), for example in response to a scan mode request from PC 110 (see Step 806, FIG. 8), whereupon processor 1212 causes module 214 to enter the scan mode of operation (Step 2114).

Figure 25:
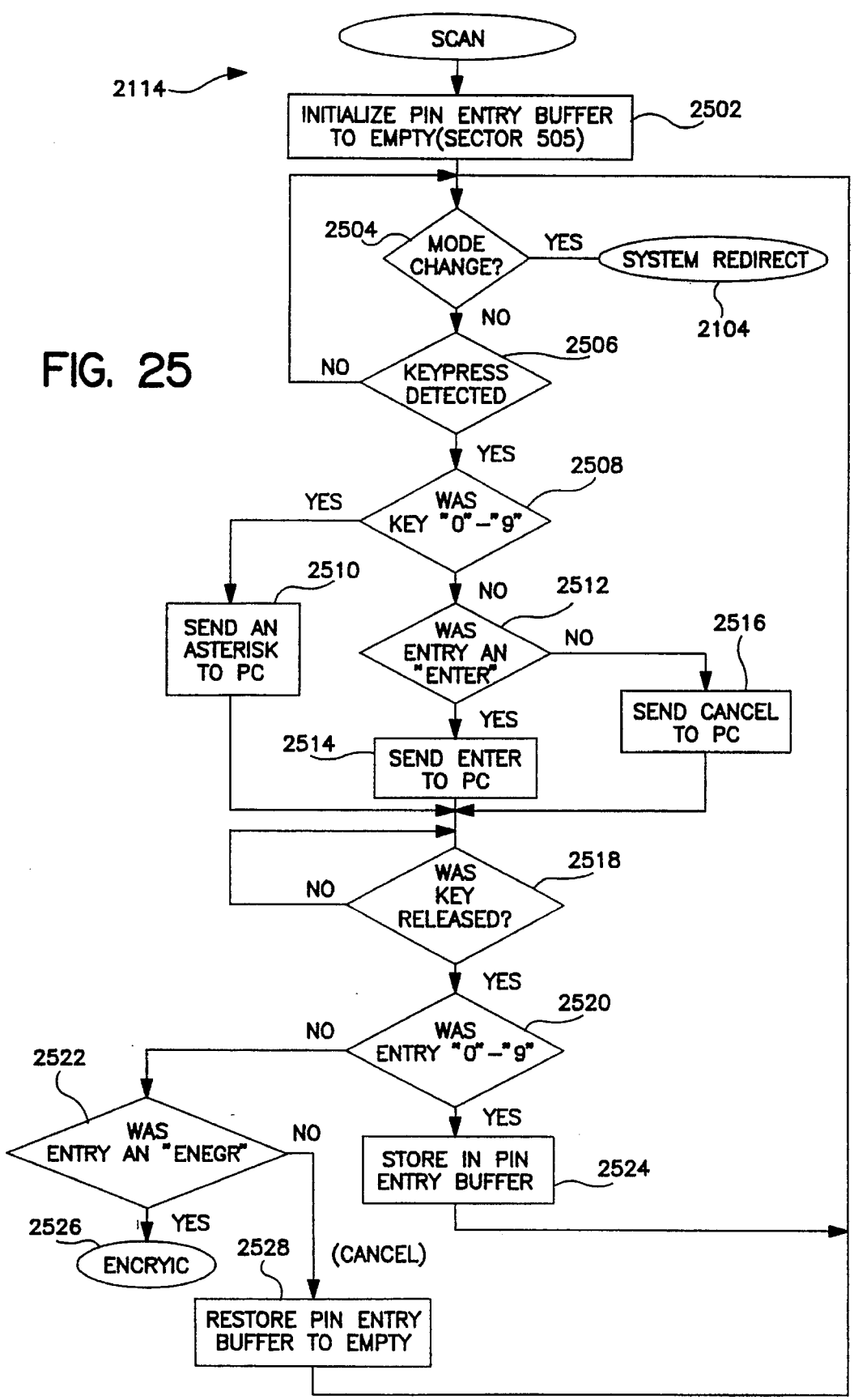

More particularly and referring now to FIG. 25 (scan mode 2114) generally involves "scanning" the circuitry associated with keypad 1102 (FIG. 14) to detect data (e.g. PIN) entered into keypad 1102 by the user.

With continued reference to FIG. 25, scan mode operation involves, inter alia, initializing PIN entry buffer 1814 of RAM 1802 to empty (Step 2502), to prepare the PIN buffer to receive data which is about to be entered onto keypad 1102 by the user.

The system detects whether a subsequent mode change command has been received (Step 2504); if so, the system returns to system redirect Step 2104. If no mode change has occurred, module 214 waits until a keypress is detected (Step 2506) or, alternatively, until a mode change is detected (Step 2504).

More particularly, processor 1212 scans ports PB0–PB3 and ports PE0–PE2 (See FIG. 13) corresponding to rows 1–4 and columns 1–3 of keypad 1102, respectively (See FIG. 14). When a keypress is detected, the system determines if the depressed key corresponds to one of the numbers 0–9 (Step 2508); if so, module 214 suitably sends a signal to PC 110 to cause a "dummy" indicia of the depressed key to screen 202 (FIG. 2).

More particularly, the operational program stored in sector 1904 of ROM 1902 (FIG. 19) of processor 1212 suitably includes an operating code which permits module 214 to communicate with PC 110 in a manner which emulates the manner in which conventional keyboards (e.g. keyboard 206) typically communicate with box 204. In a preferred embodiment of the present invention, the operating code governing the operation of module 214 is suitably configured in accordance with any suitable protocol, for example the protocol employed by IBM in its PCs or any other suitable derivative or variant thereof, to thereby permit module 214 to communicate with box 204 in a manner which emulates conventional communication between keyboard 206 and box 204, data transmission and other communication between module 214 and box 204 may be conveniently and efficiently carried out in a manner which is essentially transparent to box 204; that is, when box 204 receives data and/or information from module 214, box 204 interprets the data just as though box 204 had received it from keyboard 206. Similarly, when box 204 transmits data and/or information which is received by module 214, box 204 configures the data/information packages in the same manner in which box 204 would normally configure the data for receipt by keyboard 206. By leveraging presently known data transmission protocols in this manner, module 214 may be conveniently interposed in series between the keyboard and the keyboard port on the PC of essentially all PCs which comport with industry recognized protocol schemes.

With continued reference to FIG. 25, if a keypress corresponds to a 0 through 9, the system waits until the key is released (Step 2518) before capturing the data. In this way, the system desirably avoids capturing repetitive data which may often be generated by many keypads which are specifically configured to continuously generate repetitive keystroke data when a particular key is held down by the user.

Return now to Step 2508, if the keypress was not a 0 through 9, the system determines if the keypress corresponds to an "Enter" (Step 2512); if so, a message corresponding to an "Enter" command is transmitted from module 214 to PC 110 (Step 2514), indicating that entry of the confidential data (e.g. PIN) is complete. If, on the other hand, the keypress does not correspond to an "Enter", the system determines the identity of the keypress. In the context of the illustrated embodiment, if the keypress does not correspond to a 0 through 9, and further does not correspond to an "Enter", the system concludes that the keypress corresponds to a "Cancel" (Step 2516). Thus, module 214 transmits a message to PC 110 indicating that entry of the confidential data has been canceled by the user.

Upon release of the depressed key by the user (Step 2518), the system determines if the keypress corresponds to a 0 through 9 (Step 2520); if so, the particular numeric keypress is suitably stored in PIN entry buffer 1814 of RAM 1802 (Step 2524), and the system returns to Step 2504 to await the next keypress.

If the keypress corresponds to a "Cancel" (Step 2522), the systems restores PIN entry buffer 1814 to empty (Step 2528) and returns to Step 2504 to await either a mode change or a subsequent keypress.

If the keypress corresponds to an "Enter" ("Yes" branch of Step 2522), module 214 suitably encrypts the data stored in PIN enter buffer 1814 (Step 2526), as discussed in greater detail below in conjunction with FIG. 26.

Although the illustrated embodiment is described in the context of numeric (i.e., "0" through "9") PIN data, it will be appreciated that the confidential data entered into module 214 may be of any suitable form, e.g., numeric, alpha, alphanumeric, ASCII, binary, or any other suitable modality.

Figure 26:
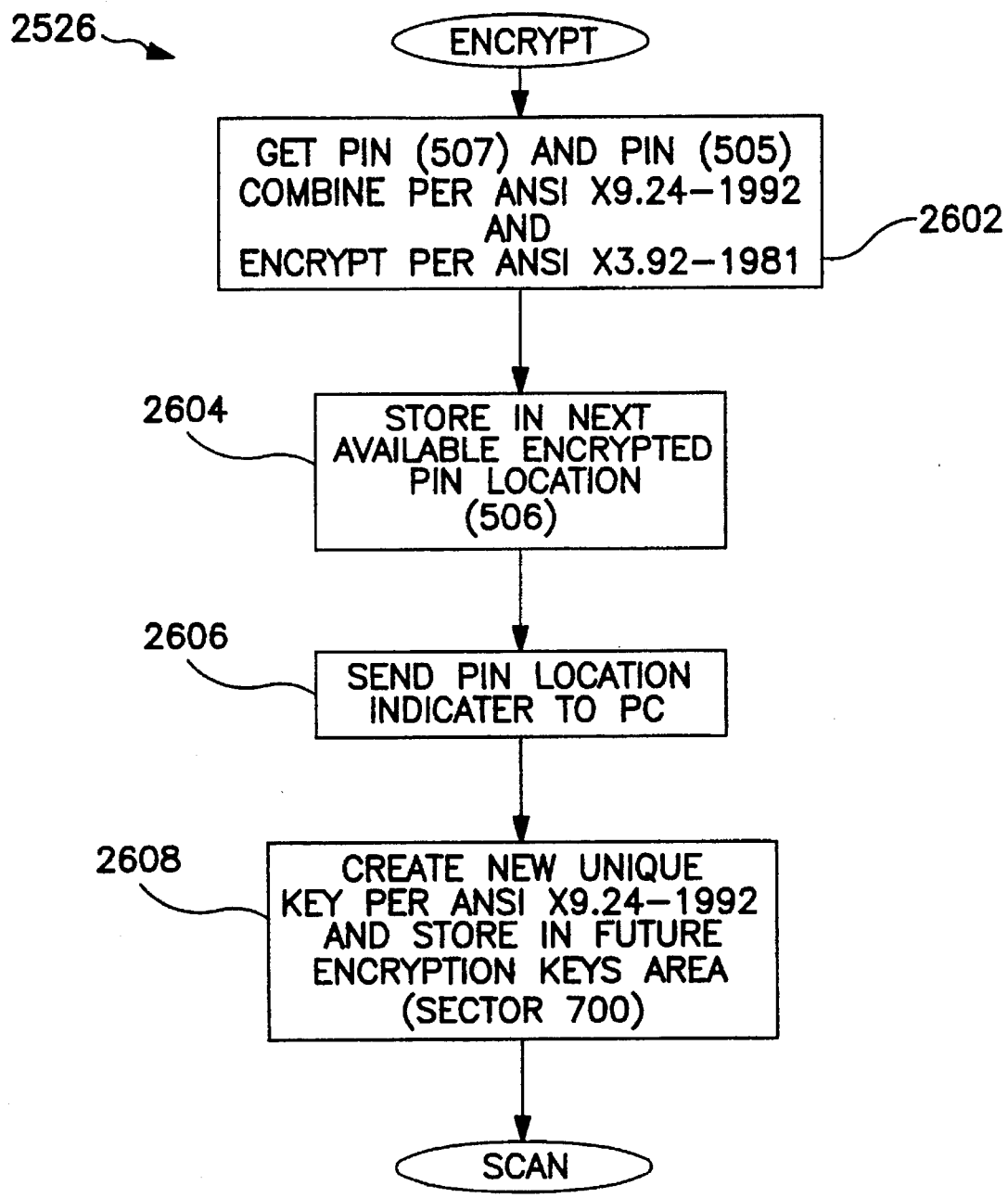

Referring now to FIG. 26, the encryption operation 2526 suitably proceeds as follows. Once the confidential data (e.g., PIN) is entered onto keypad 1102 by the user, processor 1212 retrieves the data from personal account number register 1818 of RAM 1802 and the PIN from buffer 1814 (Step 2602). These data, alone or in conjunction with other data, are suitably combined and encrypted in any suitable matter (Step 2602). In a preferred embodiment, these data may be suitably combined in accordance with ANSI specification X9.24- 1992. The data is suitably encrypted in accordance with ANSI standard X3.92-1981 or any other desired encryption technique. More particularly, the foregoing combination and encryption algorithms are desirably resident in operational program sector 1904 of ROM 1902, and operate in conjunction with encryption key information suitably stored in EEPROM 2002 (See FIGS. 19 and 20). By storing the encryption key data in nonvolatile memory (i.e., EEPROM), system integrity and security is enhanced.

With continued reference to FIG. 26, upon encrypting the data in accordance with Step 2602, the encrypted data is suitably written into the next successive location in encrypted PIN sector 1816 of RAM 1802 (Step 2604). Thereafter, the address corresponding to the location in sector 1816 wherein the encrypted data is written is transmitted to PC 110 (Step 2606). More particularly, and with momentary reference to FIG. 2, once the data is encrypted within module 214, the location of the encrypted data is transmitted to PC 110 via connector 212, such that unencrypted confidential data need not be transmitted from module 214 to PC 110 in order to effect a transaction.

After encrypting the data, processor 1212 suitably creates a new unique key for use in a subsequent encryption process and stores the new key in future encryption key sector 2004 of EEPROM 2002 (Step 2608). In accordance with one aspect of the present invention, the new encryption key may be generated in accordance with any suitable scheme which is compatible with the encryption algorithm executed in Step 2602. In accordance with a preferred embodiment, a new unique encryption key may be generated in accordance with ANSI X9.24-1992.

Upon transmitting indicia of the encrypted data from module 214 to PC 110, PC 110 continues to execute the application program residence therein, as described above in detail in connection with FIGS. 4–10.

Returning now to the main control loop 2100 of module 214 (FIG. 21), module 214 may also elect to enter card swipe mode 2118 (Step 2116). More particularly, and with momentary reference to FIG. 7, PC 110 may request Module 214 to enter the card swipe operational mode, for example at a point during the execution of the application software resident in PC 110 where such application software prompts the user to swipe his transaction card through card swipe slot 1104 of module 214 (FIG. 11), for example as discussed above in connection with Step 716.

Figure 27:
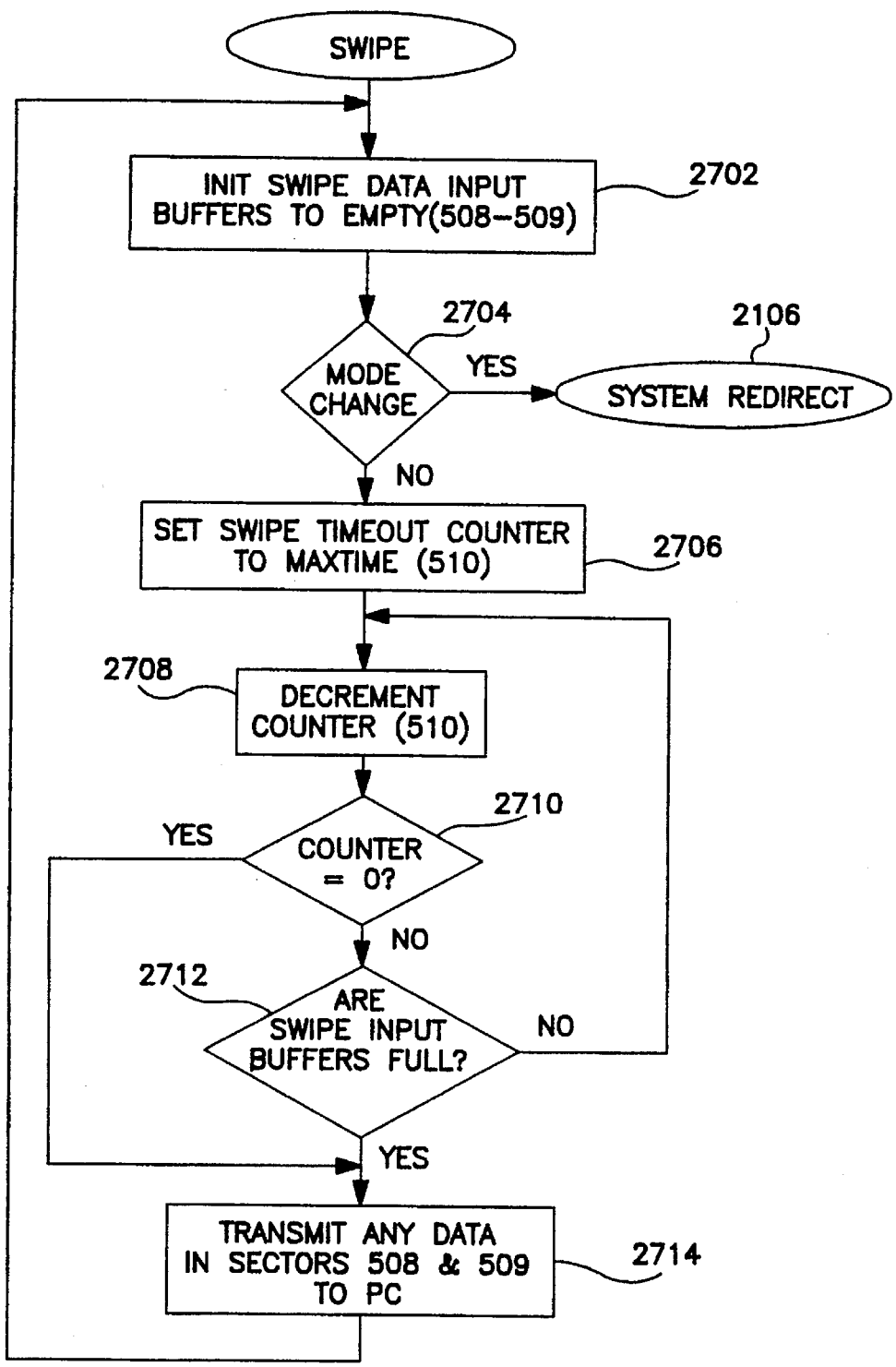

Referring now to FIG. 27, upon entering the swipe operational mode, processor 212 suitably initializes (clears) respective swipe data input buffers 1820, 1822 of RAM 1802 (Step 2702). The system then looks for a mode change (Step 2704), and returns to system redirect state 2106 if a mode change is detected. Otherwise, the system sets a swipe timeout counter to a predetermined maxtime during which the transaction must engage the card reader (Step 2706). In a preferred embodiment, the predetermined value of this maxtime, on the order of 15 seconds, is suitably stored in swipe time-out register 1824 of RAM 1802.

The time-out counter is successively decremented (Step 2708) until the software timer resident in sector 1824 reaches zero (Step 2710), whereupon the data then resident in buffers 1820, 1822 are transmitted to PC 110 (Step 2714). Alternatively, rather than waiting until the maxtime counter counts down to zero, the "swiped" data may be transmitted to PC 110 when processor 1212 determines that respective input buffers 1820, 1822 are full (Step 2712).

Upon the first to occur of the timing out of these swipe timeout timer (Step 2710) or a detection that the swipe input buffers are full (Step 2712), the data within card swipe buffers 1820, 1822 are transmitted to PC 110 (Step 2714).

With momentary reference to FIGS. 12 and 16–17, recall that magnetic strip reader circuit 1206 "reads" the data from the magnetic strip on a transaction card through magnetic head reader 1602 (or magnetic head readers 1603(*a*), 1603(*b*) in FIG. 17), whereupon reader circuit 1206 applies an output signal (corresponding to one or both of "ch 1 swipe" and "ch 2 swipe") to ports pa0 and pa1 of processor 1212, respectively, as discussed in detail above.

Figure 28:
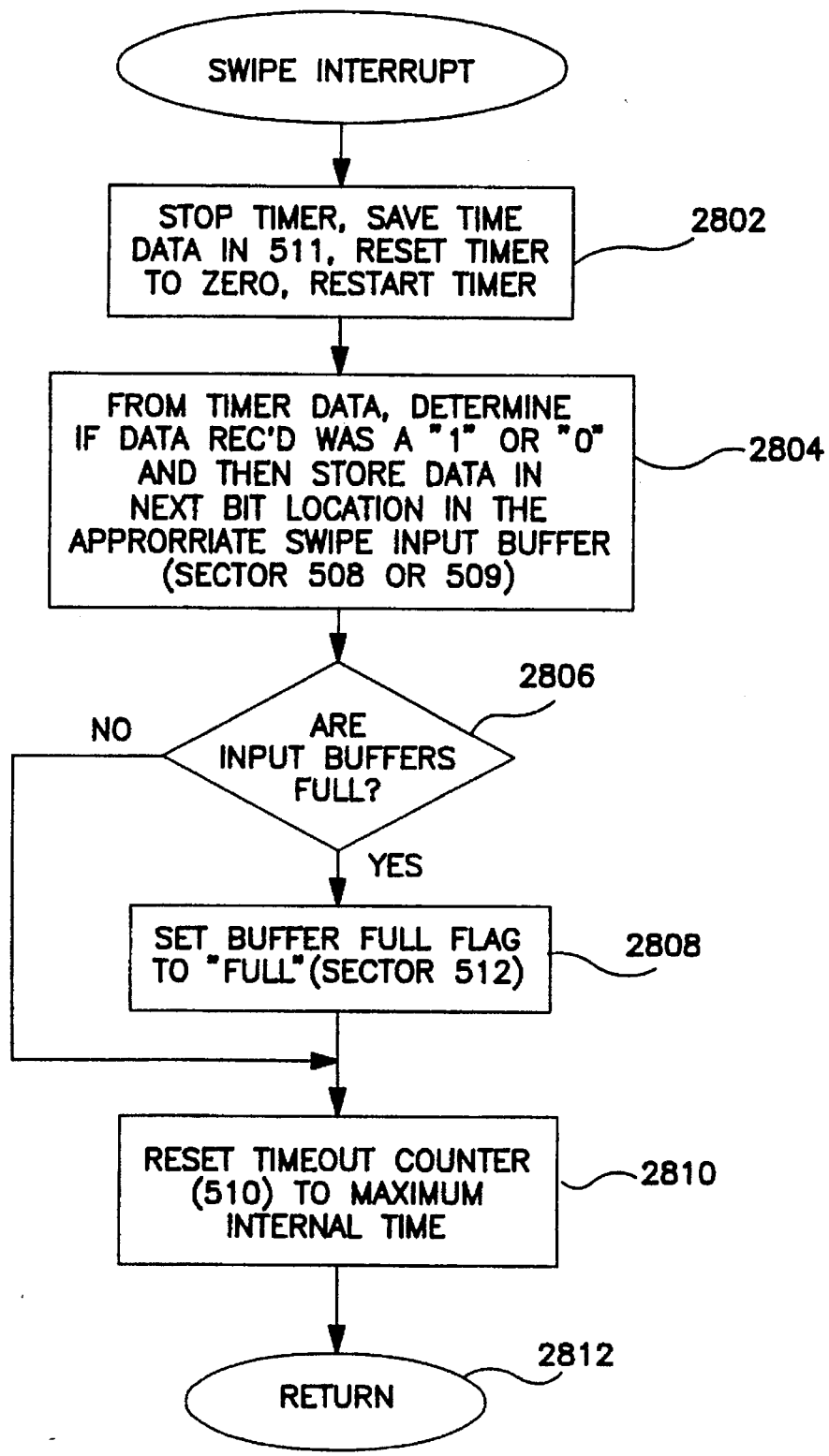

More particularly and with reference to FIGS. 16 and 28, as a transaction card bearing a magnetic strip is drawn through card reader slot 1104 (see FIG. 11), magnetic reader head 1602 outputs alternating high and low voltage levels corresponding to the data encoded on the magnetic strip. Upon the detection of a first output level from schmidt trigger 1612, for example a logic high value, a hardware timer (not shown) resident in processor 1212 is stopped, and the time at which this timer is stopped is suitably saved in swipe timer * register 1826 of RAM 1802 (see FIG. 18) (Step 2802). The card swipe timer is again reset to zero and restarted, awaiting the detection of a next predetermined voltage level from schmidt trigger 1612 (Step 2802).

In conjunction with the timer data retrieved in Step 2802, processor 1212 determines if the output of schmidt trigger 1612 corresponds to a predetermined logic state (e.g. a zero or a one) (Step 2804). This logic data may then be stored in successive bit locations in the appropriate swipe input buffer (e.g., buffer 1820, 1822) (Step 2804). The system them determines if the swipe input buffer(s) is full (Step 2806). If the swipe input buffer is full, a buffer full flag is suitably set in swipe buffer full flag register 1828 of RAM 1802 (FIG. 18) (Step 2808), which permits processor 1212 to determine when the swipe input buffer(s) is full (see Step 2712, FIG. 27).

Returning now to Step 2806 of FIG. 28, if the swipe input buffer(s) is not full, the aforementioned software timer is reset to a maximum bit interval value (Step 2810), and the process returns (Step 2812) to the point at which it left the process set forth in FIG. 27, whereupon the process of FIG. 28 is repeated on a bit-by-bit interrupt basis until all the appropriate data is "read" from the magnetic strip on the transaction card. Note, however, that the entire process of accumulating the card swipe data described in conjunction with FIG. 28 occurs in a very short period of time, for example ten milliseconds to one second, as a card is drawn through card reader slot 1104 (FIG. 11).

Returning now to FIG. 21, module 214 is also configured to enter print mode 2122 from main loop 2100 (Step 2120) for example upon a request to do so from PC 110 (see Step 816, FIG. 8).

Figure 29:
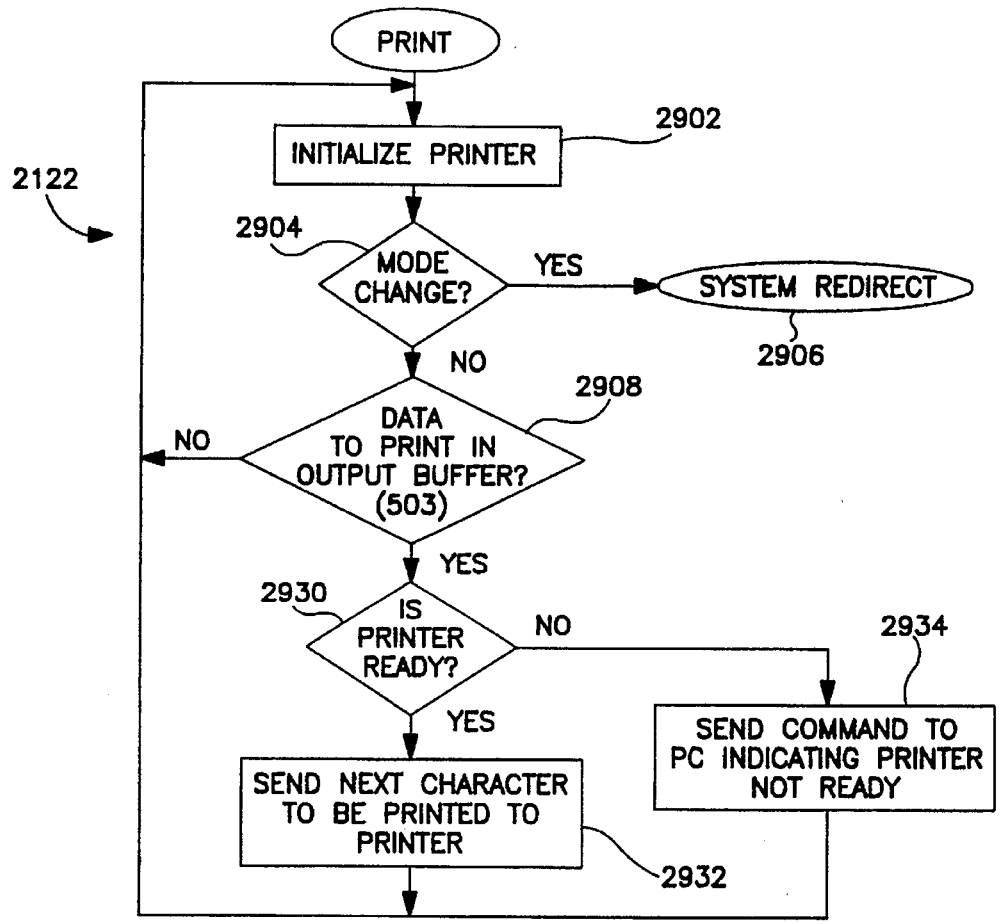

Referring now to FIG. 29, print operation mode 2122 suitably entails initializing the printer (Step 2902), for example to establish various hardware and software parameters associated with the printing process. In this regard, and as briefly discussed above, the printer may be affiliated with PC 110, for example by connecting a printer directly to box 204, or by connecting the printer to PC 110 via a suitable networking configuration. Alternatively, the printer may interface directly with the encryption module, for example at connector 310 of module 300 (FIG. 3 or, alternatively, at peripheral device module 1200 of module 214 as shown in FIG. 12.

With continued reference to FIG. 29, the system determines if a mode change has occurred (Step 2904) and, if so, returns to system redirect Step 2906.

The system then determines if the data to be printed is currently available, for example by interrogating data output buffer 1810 (FIG. 18) (Step 2908). If the data is not available, the system returns to Step 2902 to await the data to be printed. If the data is available ("Yes" branch of Step 2908), the system determines if the printer is ready (Step 2930). In this regard, the printer to be checked will likely be connected to module 214, inasmuch as it would not typically be necessary to execute print operation 2122 if the printer were connected to PC 110. Stated another way, if PC 110 is equipped with a printer, the print operation may be controlled directly by PC 110, while the print operation as set forth in FIG. 29 is appropriately controlled by module 214 if the printer employed in the context of the present invention is interfaced with module 214.

With continued reference to FIG. 29, if the printer is not ready, module 214 suitably sends a command to the PC indicating that the printer associated with module 214 is not ready. In this regard, PC 110 may prompt the user to correct the printer situation, for example as described above in conjunction with FIG. 7.

If the printer associated with module 214 is ready, the data resident in data output buffer 1810 is transmitted to the printer, for example via serial bus 1211 (see FIG. 12). In accordance with the preferred embodiment, the data to be printed is transmitted to the printer in serial fashion; hence, the process set forth in FIG. 29 is desirably repeated until the data present in data output buffer 1810 is sequentially transmitted to the printer.

Figure 30:
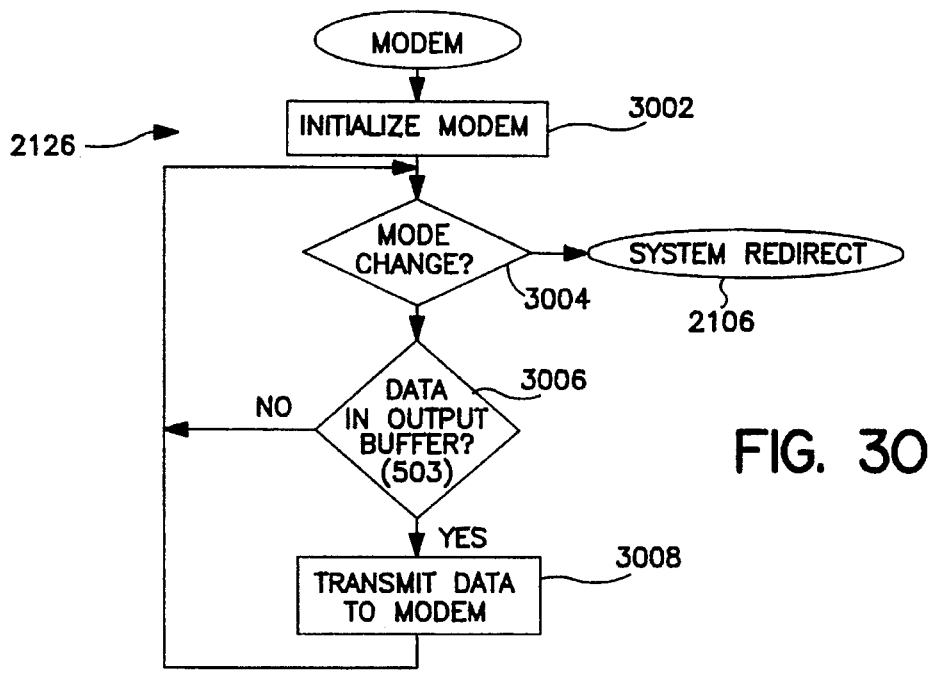

Returning now to main loop 2100 (FIG. 21) and with reference to FIG. 30, module 214 is suitably configured to enter modem mode 2126 (Step 2124), for example in response to a request to do so from PC 110 (see Step 710, FIG. 7). As briefly discussed above, the present invention may be configured to transmit data and information from PC 110 to host computer 102 in any convenient manner, for example via a modem associated with PC 110 or, alternatively, modem 1202 associated with module 214 (or modem connector 308 associated with module 300; FIG. 3). If data is transmitted from PC 110 via a modem associated with PC 110, it would not generally be necessary for module 214 to execute modem operation 2126; rather, the modem operation may be effectively carried out by PC 110. If, on the other hand, modem operation is to be effected through a modem interfaced with module 214, it may be particularly advantageous for processor 1212 to control the modem operation.

With continued reference to FIG. 30, modem operation 2126 suitably entails an initialization of modem 1202 (Step 3002). Module 214 then determines if a mode change has occurred (Step 3004) and, if so, the system returns to system redirect 2106. If a mode change has not occurred, the system determines if data output buffer 1810 contains the data to be transmitted via modem (Step 3006). If the data is not resident in buffer 1810, the system returns to Step 3004 and continues cycling between Steps 3004 and 3006 until the data is written into buffer 1810 or until a mode change occurs.

When data output buffer 1810 contains the appropriate data to be transmitted via modem, processor 1212 retrieves the data from output 1810 and transmits the data via modem to host computer 102 (Step 3008). When it is desired for module 214 to receive data via modem, for example from host computer 102, processor 1212 may be suitably configured to retrieve the data from modem 1202, for example at modem interrupt port pa2.

Figure 31:
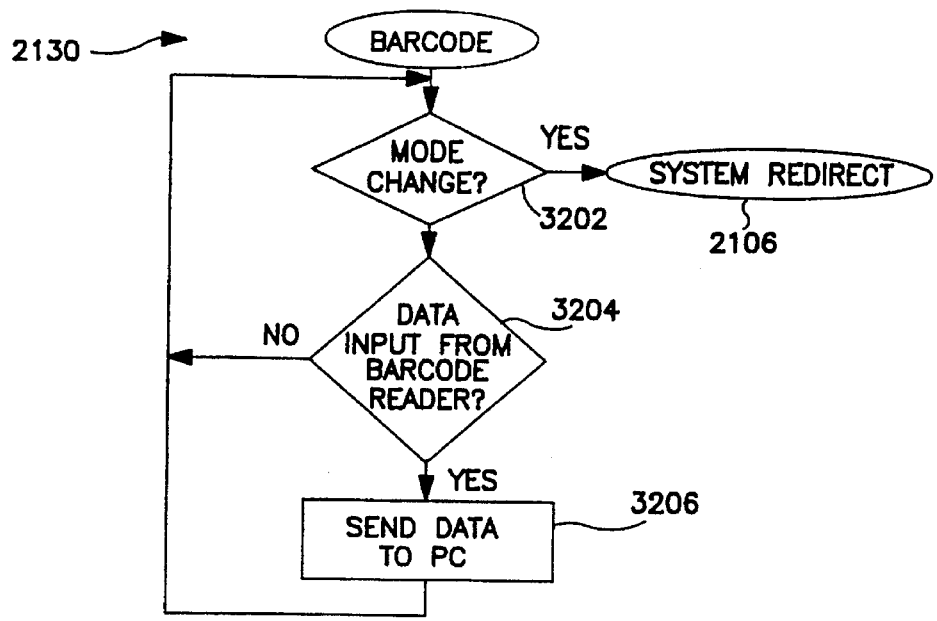

Referring now to FIG. 31, PC 110 suitably transmits a request to module 214 to transmit data via the modem connected to module 214. More particularly, a modem interrupt message is applied to port PA2 of module 1212 by modem 1202. Module 214 then determines if the message corresponds to a "data received" interrupt (Step 3102) or a modem transmit interrupt (Step 3104). If a data received interrupt occurs ("Yes" branch of Step 3102), indicating that data has been received at modem 1202, the data received at modem 1202 is retrieved by processor 1212 and transmitted to the PC via connector 212 (Step 3106).

If the modem interrupt message corresponds to a modem transmit request (Step 3104), processor 1212 retrieves the data to be transmitted from buffer 1810 and applies the data, for example on a byte-by-byte basis, to modem 1202 (Step 3108).

If the modem interrupt corresponds to neither a data received or a data transmit message, an error message is suitably sent to the PC (Step 3110).

After data which is received at modem 1202 is retrieved and sent to PC 110 (Step 3106), and after data is sent by processor 1212 from buffer 1810 to modem 1202 (Step 3108), the system returns (Step 3112) to the low level process of FIG. 30, and the process is repeated for each successive interrupt generated by modem 1202.

Figure 32:
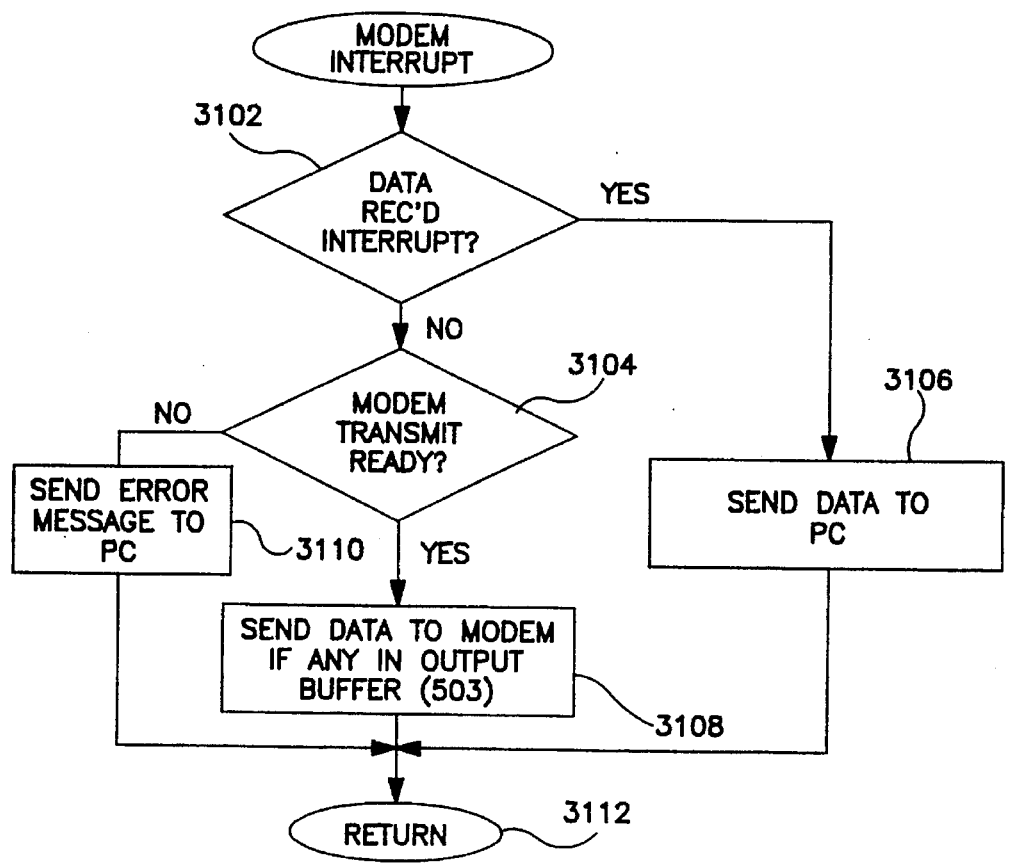

Referring now to FIGS. 21 and 32, module 214 may be suitably configured to enter bar code operational mode 2130 (Step 2128), for example in response to a request to do so from PC 110. Bar code operation 2130 suitably entails determining whether a mode change has occurred (Step 3302) and, if so, returning to system redirect Step 2106. If a mode change has not occurred, data may be input from a general purpose module 1210, for example a bar code reader (Step 3204). Once the bar code or other data is received by module 214, it may be appropriately transmitted to PC 110, as desired (Step 3206).

Figure 33:
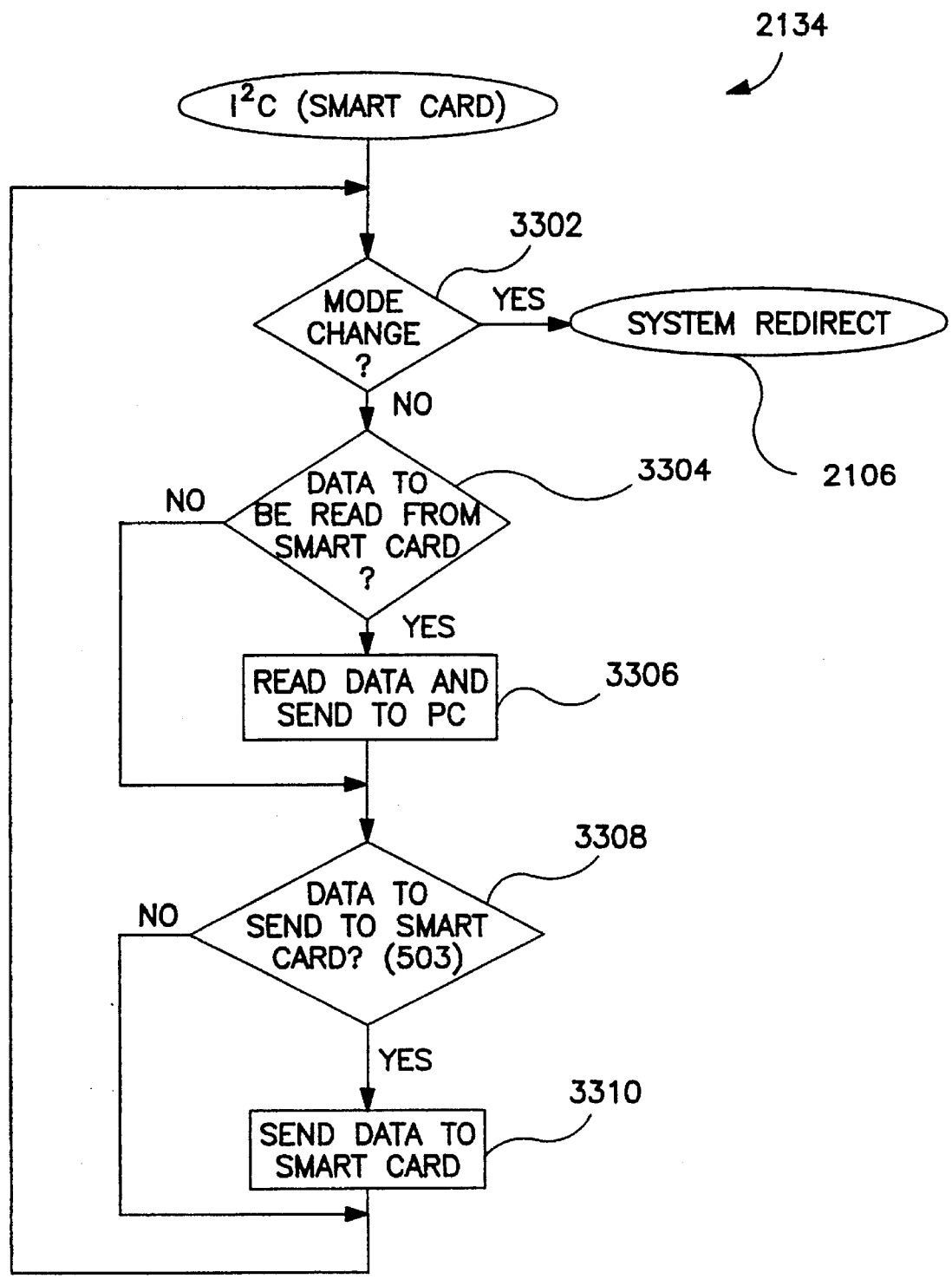

Referring now to FIGS. 21 and 33, module 214 may be suitably configured to execute a smart card operation 2134 (Step 2132), for example in response to a request from PC 110 to do so. In this regard, although many of the various functional features associated with module 214 (e.g. modem operation 2126, print operation 2122, swipe operation 2118, and the like) are initiated in response to a request from PC 110 in accordance with the embodiment described herein, it will be appreciated that the various operational states of module 214 may suitably be effected in any desired manner, for example by entering appropriate commands directly into module 214.

With continued referenced to FIG. 33, smart card mode 2134 suitably entails determining whether a mode change has occurred (Step 3302) and, if so, returning to system redirect Step 2106.

If no mode change has occurred, the system determines if data is to be read from a smart card (Step 3304). In this regard, and as briefly stated above, such a request may come from PC 110, or may be otherwise effected by the user, for example by entering a particular code or depressing other buttons (not shown) onto keypad 1102 (FIG. 11).

If data is to be read from a smart card ("Yes" branch of Step 3304), data is retrieved by processor 1212, for example via smart card reader 1208 (FIG. 12). Upon retrieving the data from the smart card, the data may be transmitted to PC 110 (Step 3306).

As discussed above, module 214 may also be configured to write data onto a smart card. In this case, the appropriate data to be written onto the smart card may be suitably retrieved from data output buffer 1810 and applied to smart card circuit 1208 (Steps 3308, 3310).

Figure 34:
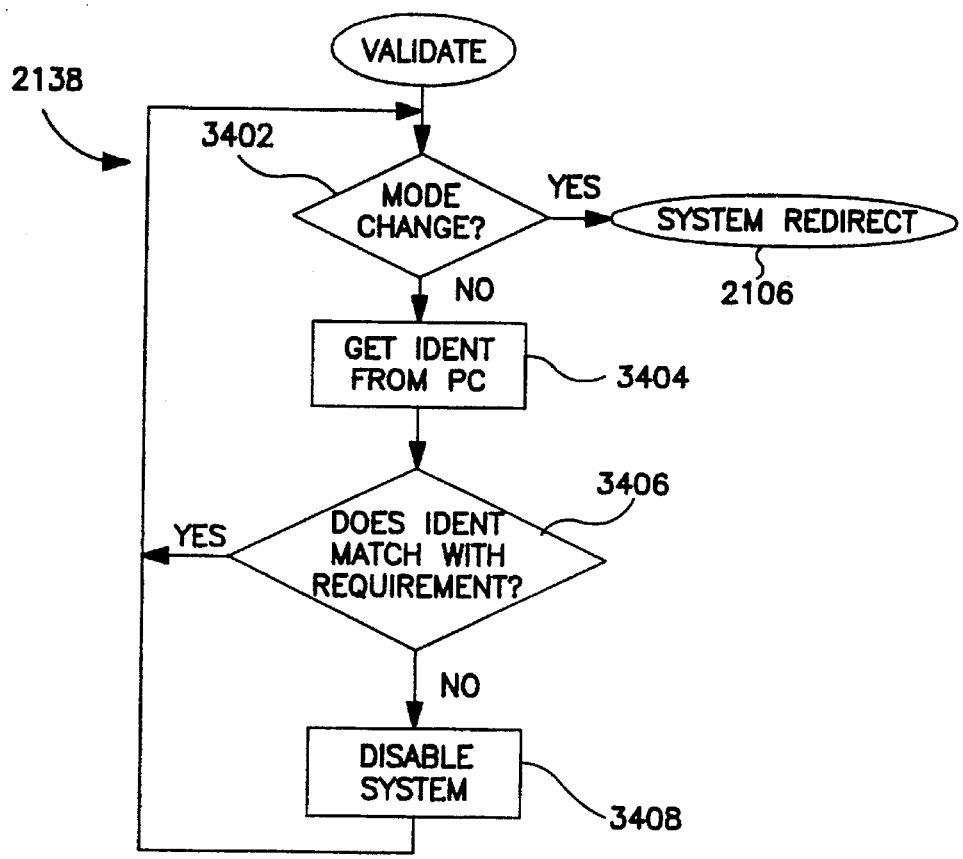

Referring now to FIGS. 21 and 34, module 214 in the PC application software discussed above in conjunction with FIGS. 4–10 may be suitably configured such that the application software resident in PC 110 must first validate module 214 before permitting the transmission of encrypted data or otherwise performing functions described herein. More particularly, in view of the importance of maintaining security in the context of real time funds transfer authorization, it may be desirable to permit PC 110 (e.g., through software) to confirm that module 214 embodies satisfactory security features before effecting transactions.

With continued reference to FIGS. 21 and 34, module 214 may be suitably configured to enter a system validation mode 2138 (Step 2136), for example in response to a request from the user or from PC 110 to do so. System validation mode 2138 entails, inter alia, a determination of whether a mode change has occurred (Step 3402) and, if so, the system may be configured to return to system redirect Step 2106.

Module 214 may then be configured to receive and/or retrieve validation data from PC 110, which validation data either confirms that the application software running on PC 110 is compatible with module 214; alternatively, the validation data may permit module 214 to run a self-check to determine if adequate security mechanisms are in place. Module 214 may then confirm that it is compatible with the software resident on PC 110 (Step 3406). If the system determines that either module 214 or the application program running on PC 110 are not "valid" according to predetermined validation criteria, module 2]4 may be configured to either disable itself or to disable the software running on PC 110 (Step 3408).

Figure 35:
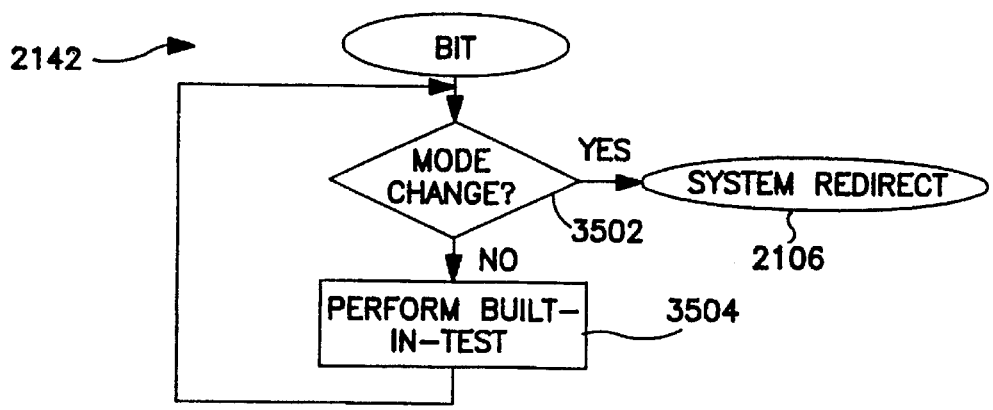
Figure 36:
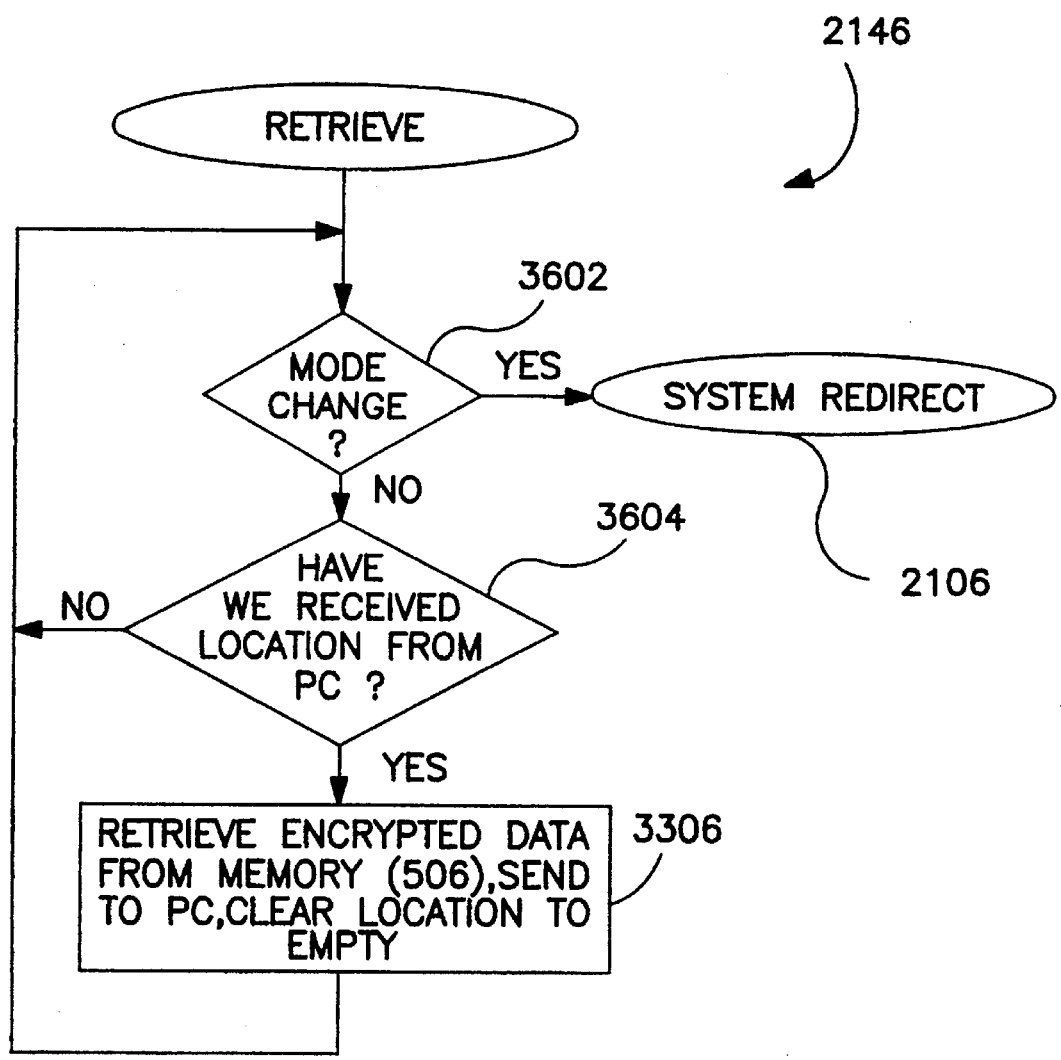

Referring now to FIGS. 21 and 35, module 214 may suitably be configured to execute a bit operation 2142 (Step 2140), for example in response to a request from PC 110 or the user to do so.

Bit operation 2142 suitably determines if a mode change has occurred (Step 3502) and, if so, returns the system to system redirect Step 2106. If a mode change has not occurred, module 214 may execute any number of built-in tests (bits) (Step 3504), for example testing various data transmission and retrieval processes, testing the presence and/or functionality of various peripheral devices, or executing the various wraparound and/or auditing facilities set forth in FIG. 1.

From time to time during the operation of PC 110, it may be desirable to transmit encrypted data from module 214 to PC 110. With continued reference to FIG. 21 and referring also to FIG. 36, module 214 may thus be configured to selectively enter retrieval mode 2146 (Step 2144), for example in response to a request to do so from the user or from PC 110.

Retrieval operation 2146 suitably entails, inter alia, determining whether a mode change has occurred (Step 3602) and, if so, returning the system to system redirect Step 2106. If a mode change has not occurred, indicating that the system remains in retrieve mode, module 214 waits for a request from PC 110 for the encrypted data, which request may include the address in sector 1816 of RAM 1802 (FIG. 18) where the desired encrypted data is stored (Step 3604). Upon receipt of a request from PC 110 to transmit encrypted data, module 214 retrieves the encrypted data from an appropriate location in memory (e.g., encrypted PIN holding area 1816), and sends the encrypted data to PC 110 (Step 3606). Upon doing so, processor 1212 may suitably reset encrypted PIN holding area 1816 back to empty.

Although the subject application has been described herein with reference to the appended drawing figures, it will be appreciated that the scope of the invention is not so limited. Various modification in the design and implementation of various components and method steps discussed herein may be made without departing from the spirit and scope of the invention, as set forth in the appended claims.

I claim:

1. A remote processing system, located at a first site, for interfacing with a host computer system located at a second site which is remote from said first site, the host computer system being of the type which includes a host modem and which is configured to facilitate financial transactions upon receipt from said remote processing system of a data packet including an encrypted data field, said remote processing system comprising:
   a. a PC, comprising:
      (1) a first memory sector configured to store an interactive software program;
      (2) a first processor configured to execute said software program
      (3) an input port configured to communicate with said first processor; and
      (4) a second modem configured to transmit said data packet from said PC to the host modem in accordance with said software program;
   b. an input device; and
   c. an encryption module connected in series between said input device and said input port, comprising:
      (1) a keypad;
      (2) a second processor configured to encrypt data entered onto said keypad; and
      (3) a data link configured to maintain communication between said encryption module and said PC input port.

2. The remote processing system of claim 1, wherein said input port comprises a keyboard input port.

3. The remote processing system of claim 1, wherein said input port comprises a mouse port.

4. The remote processing system of claim 3 wherein said remote processing system further comprises a mouse, and said encryption module is connected in series between said mouse and said PC.

5. The remote processing system of claim 2, wherein said second processor is configured to transmit said encrypted data to said input port in a manner which emulates the transmission of keyboard input data.

6. The remote processing system of claim 1, wherein said data entered onto said keypad corresponds to a PIN.

7. The remote processing system of claim 1, wherein said PC further comprises a screen, and said first processor is configured to generate a data entry prompt on said screen in accordance with said software program.

8. The remote processing system of claim 1, wherein said encryption module further comprises a peripheral device useful in electronically entering data into said encryption module.

9. The remote processing system of claim 8, wherein said peripheral device comprises a magnetic head card reader.

10. The remote processing system of claim 8, wherein said peripheral device comprises an integrated circuit card reader.

11. The remote processing system of claim 8, wherein said peripheral device comprises a bar code reader.

12. The remote processing system of claim 1 further comprising a magnetic card reader, said magnetic card reader formed integrally with said encryption module.

13. The remote processing system of claim 1 further comprising a smart card reader, said smart card reader formed integrally with said encryption module.

14. The remote processing system of claim 1 wherein said second processor of said encryption module comprises a random access memory, a read only memory, and an electronically programmable read only memory for providing additional security for said encryption module.

15. A data encryption module configured for connection to a PC, the PC being of the type which includes a keyboard, a keyboard input port, and a connector having a first end connected to said keyboard and a second end configured for connection to said keyboard input port, said module comprising:

a. a keypad;

b. a processor adapted to encrypt data entered onto said keypad;

c. an interface connector extending from said module for receipt within said keyboard input port; and d. an interface port configured to receive said second end of said connector.

16. The encryption module of claim 15, further comprising an input data transducer for entering data into said module other than through said keypad.

17. The module of claim 16, wherein said transducer comprises at least one of a magnetic head card reader, an integrated circuit card reader, a bar code reader, a voice recognition device, and a scanner.

18. The module of claim 15, further comprising a housing within which said processor is disposed, and wherein said keypad is disposed substantially integral with a surface of said housing.

19. A remote processing system for interfacing with a host computer system including a host modem, the host computer system being configured to facilitate financial transactions upon receipt from said remote processing system of a data packet including an encrypted data field, said remote processing system comprising:

a. a PC, comprising:
(1) a PC housing;
(2) a first processor, disposed within said PC housing, configured to execute a software program;
(3) an input port accessible from outside of said PC housing and configured to communicate with said first processor; and
(4) a PC modem configured to transmit said data packet from said PC to the host modem in accordance with said software program; and b. an encryption module, comprising:
(1) a module housing;
(2) a keypad accessible from outside of said module housing;
(3) a second processor disposed within said module housing and configured to encrypt data entered onto said keypad;
(4) a data link configured to maintain communication between said encryption module and said PC input port.
(5) a second input port configured to receive an input from a keyboard of said PC.

20. The remote processing system of claim 19, wherein:

a. said input port comprises a keyboard input port;

b. said PC further comprises a keyboard, and said encryption module is connected in series between said keyboard and said keyboard input port; and c. said second processor is configured to transmit said encrypted data to said input port in a manner which emulates the transmission of keyboard input data.

21. A method for transmitting confidential data between a PC at a first site and a host computer located at a site remote from said first site comprising the steps of:

providing a PC comprising a first processor configured to execute a software program, and a PC modem configured to transmit data from said PC to the host computer in accordance with said software program;

providing a keyboard or mouse for communicating with said PC;

providing a self-contained, secure encryption module independent from said PC and connected in series between said PC and said keyboard or mouse, said module comprising a keypad for inputting a confidential data directly into said encryption module and a second processor for encrypting said confidential data within said module;

transmitting said encrypted data to said first processor within said PC; and transmitting said encrypted data from said PC to said host computer via said PC modem.

\* \* \* \* \*